(12) United States Patent
Chiba et al.

(10) Patent No.: US 7,848,579 B2
(45) Date of Patent: Dec. 7, 2010

(54) IMAGE CODING DEVICE, METHOD AND COMPUTER PROGRAM WITH DATA CODING AMOUNT PREDICTION

(75) Inventors: Takuma Chiba, Osaka (JP); Kei Tasaka, Nara (JP)

(73) Assignee: Panasonic Corporation, Osaka (JP)

( * ) Notice: Subject to any disclaimer, the term of this patent is extended or adjusted under 35 U.S.C. 154(b) by 1011 days.

(21) Appl. No.: 11/634,137

(22) Filed: Dec. 6, 2006

(65) Prior Publication Data

US 2007/0133892 A1 Jun. 14, 2007

(30) Foreign Application Priority Data

Dec. 9, 2005 (JP) .............................. 2005-357039

(51) Int. Cl.
*G06K 9/36* (2006.01)
(52) U.S. Cl. ..................... 382/232; 341/51; 341/107; 375/240.03
(58) Field of Classification Search ............ 382/232, 382/236, 239; 341/51, 107; 375/240.03
See application file for complete search history.

(56) References Cited

U.S. PATENT DOCUMENTS

| 5,774,594 | A | | 6/1998 | Kitamura |
| 6,005,981 | A | * | 12/1999 | Ng et al. ...................... 382/240 |
| 6,812,865 | B2 | * | 11/2004 | Saunders ...................... 341/51 |
| 2003/0081850 | A1 | * | 5/2003 | Karczewicz et al. ........ 382/247 |
| 2005/0249289 | A1 | | 11/2005 | Yagasaki et al. |
| 2006/0256857 | A1 | * | 11/2006 | Chin ..................... 375/240.03 |

FOREIGN PATENT DOCUMENTS

| JP | 09-009261 | 1/1997 |
| JP | 2001-0326930 | 11/2001 |
| JP | 2004-135251 | 4/2004 |

OTHER PUBLICATIONS

Wiegand et al. "Overview of the H.264/AVC Video Coding Standard", IEEE Transactions on Circuits and Systems for Video Technology, Jul. 2003, pp. 1-19.*

* cited by examiner

*Primary Examiner*—Vikkram Bali
*Assistant Examiner*—Eueng-Nan Yeh
(74) *Attorney, Agent, or Firm*—Wenderoth, Lind & Ponack, L.L.P.

(57) ABSTRACT

An image coding device in which entropy coding is applied to binarized data. An image coding unit codes image data; an entropy coding unit binarizes the coded image data and applies entropy coding to the binarized data; and a coding amount prediction unit obtains a predictive value corresponding to a coding amount of the image data on a predetermined data unit basis prior to the actual binarizing. A coding amount comparing unit compares the predictive value to a predetermined threshold value; a I_PCM decision unit outputs a selection signal indicating the image data on a predetermined data unit basis or I_PCM data, which is selected based on a result of the comparing; and an output selection unit and an output unit output the selected data indicated by the selection signal.

21 Claims, 15 Drawing Sheets

FIG. 6

| Conversion Table ||
|---|---|
| value of quantized coefficient | bit number of binary data |
| 0 | 1 |
| 1 | 2 |
| 2 | 3 |
| 3 | 4 |
| 4 | 5 |
| ⋮ | ⋮ |
| 14 | 15 |
| 15 | 17 |
| 16 | 17 |
| 17 | 19 |
| 18 | 19 |
| 19 | 19 |
| ⋮ | ⋮ |

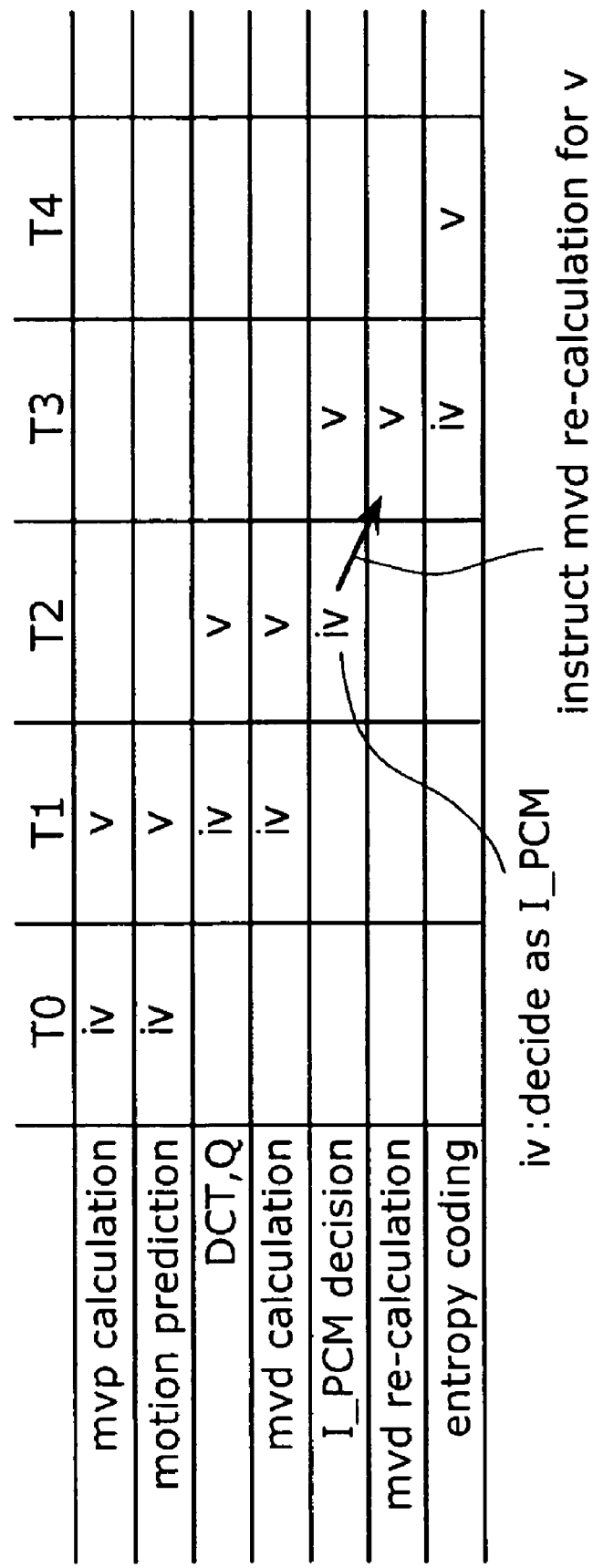

IMAGE CODING DEVICE, METHOD AND COMPUTER PROGRAM WITH DATA CODING AMOUNT PREDICTION

BACKGROUND (1) Field of the Invention

The present invention relates to an image coding device which codes data regarding moving pictures, and more particularly to a coding device according to the H.264/AVC standard.

(2) Description of the Related Art

With the development of digital technologies, technologies for coding imaged have progressed and developed. However, image data (especially moving picture data) has a large amount of data. Therefore, when digital image data is coded and then broadcasted or transferred via a medium such as a DVD, the amount of the data becomes quite large. Particularly, high-definition (HD) broadcasting has recently been utilized, but a data amount of HD image is six times larger compared to a conventional standard-definition (SD) image.

With the development of digital imaging technologies, data compression technologies have been utilized and developed for digital image data, in order to address the data amount increase. One example of the development is compression technologies, and especially a technology for compressing image data taking advantage of characteristics of the image data. Moreover, because of recent improvements in data processing ability of computers and other apparatuses, complicated arithmetic operations in the compression technologies have been realized, so that compression rates of image data have been significantly increased. For example, an MPEG-2 standard is a compression technology employed in satellite and terrestrial digital HD broadcasting. In satellite digital HD broadcasting, image data can be compressed to about 1:30 using the MPEG-2 method.

A further developed image compression technology is an AVC/H.264 standard. The AVC/H.264 standard can realize a compression rate that is twice higher compared to the MPEG-2 standard. The AVC/H.264 employs and combines various compression technologies to realize such a high compression rate. As a result, the amount of arithmetic operation is also increased significantly.

One of the compression technologies employed in the AVC/H.264 standard is entropy coding (variable length coding). As the entropy coding, there are two different methods called Context-based Adaptive Variable Length Coding (CAVLC) and Context-based Adaptive Binary Arithmetic Coding (CABAC). According to the CAVLC method, when a DCT coefficient is coded, a Run symbol representing a length of continuous zeros and a Level symbol are respectively coded in a direction opposite to a scanning direction, referring to respective variable length coding tables.

On the other hand, the CABAC is a method of coding a code according to an occurrence possibility of the code. The occurrence possibility is varied depending on time, thereby adaptively changing setting of the possibility of occurrence. Such a method is generally called an arithmetic coding. In the CABAC, in addition to such common arithmetic coding, another technique is used to assign each code with each context and change the occurrence possibility for each context.

The CABAC includes two main processes. The first process is called binarization, by which to-be-coded multi-valued data (a syntax) is converted to binary data. The second process is calculating a context of the converted binary data, and then applying arithmetic coding to the binary data according to the calculated context.

In the arithmetic coding, an occurrence possibility is calculated for each bit in the binary data to be used in the coding, and at the same time the occurrence possibility is updated. Since the process is performed for each bit, the operation speed is normally one bit per one clock. Further, since the occurrence possibility is adaptively changed for each bit and updated depending on a value of the bit, it is difficult to know an exact amount of output coded data, prior to the coding.

Furthermore, in the AVC/H.264 standard, a maximum coding amount of one macroblock is restricted to 3200 bits, in a case where a 4-2-0 format and 8 bit_depth. When a macroblock is coded and a resulting coding amount becomes greater than 3200 bits, it is necessary to modify conditions for coding the macroblock and code the macroblock again under the modified conditions. Therefore, there is another method of treating mb_type as I_PCM, and storing, as a bitstream, the I_PCM data instead of coded data. Here, it is also difficult to exactly know a resulting output coding amount by the CABAC until the data is actually coded and the coded data is outputted. Therefore, a decision is made, after the CABAC, as to whether or not the coding satisfies the restriction of the maximum coding amount of a macroblock.

On the other hand, still another method is disclosed in Japanese Patent Application Laid-Open No. 2004-135251 publication, for example. By the method, an amount of data inputted to an arithmetic coding circuit is monitored. Then, if an amount of the input data per certain portion exceeds a predetermined amount, the input data is not coded, but data coded by a different parameter or non-compressed data is treated as input data.

FIG. 1 is a block diagram showing a functional structure of the conventional image coding device.

The image coding device 50 shown in FIG. 1 is one example of a conventional image coding device which codes inputted image data and outputs the coded data as a bitstream. The following describes processing performed by the image coding device 50.

Note that, the image data is data regarding a moving picture which includes: substantive data, such as data of a macroblock included in the moving picture; a control information, such as a macroblock type (mb_type); other attribute information; and the like.

When data regarding a moving picture, which is to be coded, is received, the data is passed to a motion prediction unit 51, an intra-picture prediction unit 52, and an I_PCM data buffer 53. The motion prediction unit 51 detects a block similar to a to-be-coded block from another picture, then obtains a differential image between the to-be-coded block and the detected block, and outputs the differential image and a motion vector. The intra-picture prediction unit 52 predicts image of the to-be-coded block in the picture using image of adjacent blocks, then obtains a differential image between the to-be-coded block and the prediction block, and outputs the differential image and information indicating the prediction method. Further, the I_PCM data buffer 53 is a buffer, in which I_PCM data is stored. The I_PCM data is original data of an input moving picture image.

The input selection unit 54 selects output from the motion prediction unit 51 or output from the intra-picture prediction unit 52, and passes the selected data to an orthogonal transformation unit 55. The orthogonal transformation unit 55 performs Discrete Consine Transform (DCT) which is a kind of orthogonal transformation. The orthogonal transformation unit 55 applies DCT to the obtained data and provides the resulting DCT coefficient to a quantization unit 56 which quantizes the DCT coefficient. The quantized DCT coefficient is passed to a binarizer 57. In the binarizer 57, the quantized DCT coefficient is converted to binary data and then coded by a CABAC encoder 59. The coded data is passed to an output selection unit 61 via an output buffer 61.

Here, an I_PCM decision unit 58 monitors a data amount of output from the binarizer 57 in the above-described processing, and can decide, according to an amount of binarized data, whether the data to be outputted as a bitstream is to be data coded by the CABAC encoder 59, or I_PCM data stored in the I_PCM data buffer 53. Alternatively, the I_PCM decision unit 58 monitors a data amount of output from the CABAC encoder 59, and can decide whether data to be outputted as a bitstream is to be I_PCM data or coded data, according to whether or not the code amount, which is an actual amount of coded data, is over 3200 bits. The output selection unit 61 outputs coded data or I_PCM data according to the decision of the I_PCM decision unit 58.

Here, according to the AVC/H.264, data of a macroblock prior to a target macroblock is used for intra-picture prediction, motion prediction, and the like. Thus, like the above-described conventional technologies, when the decision of whether or not a maximum coding amount restriction on a macroblock is satisfied is performed after CABAC, intra-picture prediction and motion prediction of the next macroblock can not be started until completion of the CABAC of the macroblock.

SUMMARY

In order to solve the above problems, an object of the present invention is to provide an image coding device which applies entropy coding to binarized data, thereby processing image data at higher speed.

An image coding device according to the present invention includes: an image coding unit which codes image data; an entropy coding unit which binarizes the coded image data and applys entropy coding to the binarized data; a prediction unit which obtains a predictive value corresponding to a predicted coding amount of the image data on a predetermined data unit basis supposing that the entropy coding were applied to the image data, the prediction unit obtaining the predicted value without actual binarizing being performed and based on information regarding the image data which is obtained from the image coding unit; and a decision unit which compares the predictive value to a predetermined threshold value and decides to output I_PCM data, which is image data that has not been applied with the entropy coding by the entropy coding unit, when the predictive value is greater than the threshold value; and an output unit which outputs the I_PCM data when the decision unit decides to output the I_PCM data, and output data applied with the entropy coding when the decision unit does not decide to output the I_PCM data.

With the above structure, the image coding device can decide whether or not data to be outputted is to be I_PCM data, prior to binarizing of to-be-coded data on a predetermined data unit basis. That is, the above decision is performed prior to processing regarding entropy coding, it is possible to speed up the processing of image data.

According to the present invention, prior to binarization for entropy coding, a decision is made as to whether or not I_PCM data is to be outputted. Thereby, the processing of image data can be speeded up. For example, when the predetermined data unit is one macroblock, it is possible to perform intra-picture prediction and motion prediction for a next macroblock, immediately after orthogonal transformation and quantization for a current macroblock. Thus, pipelining processing on a macroblock-by-macroblock becomes easy and the processing can be speeded up.

The disclosure of Japanese Patent Application No. 2005-357039 filed on Dec. 9, 2005 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 6 is one example of a conversion table used in conversion of a value of a quantized coefficient into a bit number;

FIG. 15 is a time chart of processing including mvd calculation.

DESCRIPTION OF THE DRAWINGS

The following describes the embodiment according to the prevent invention with reference to the drawings.

Figure 1:
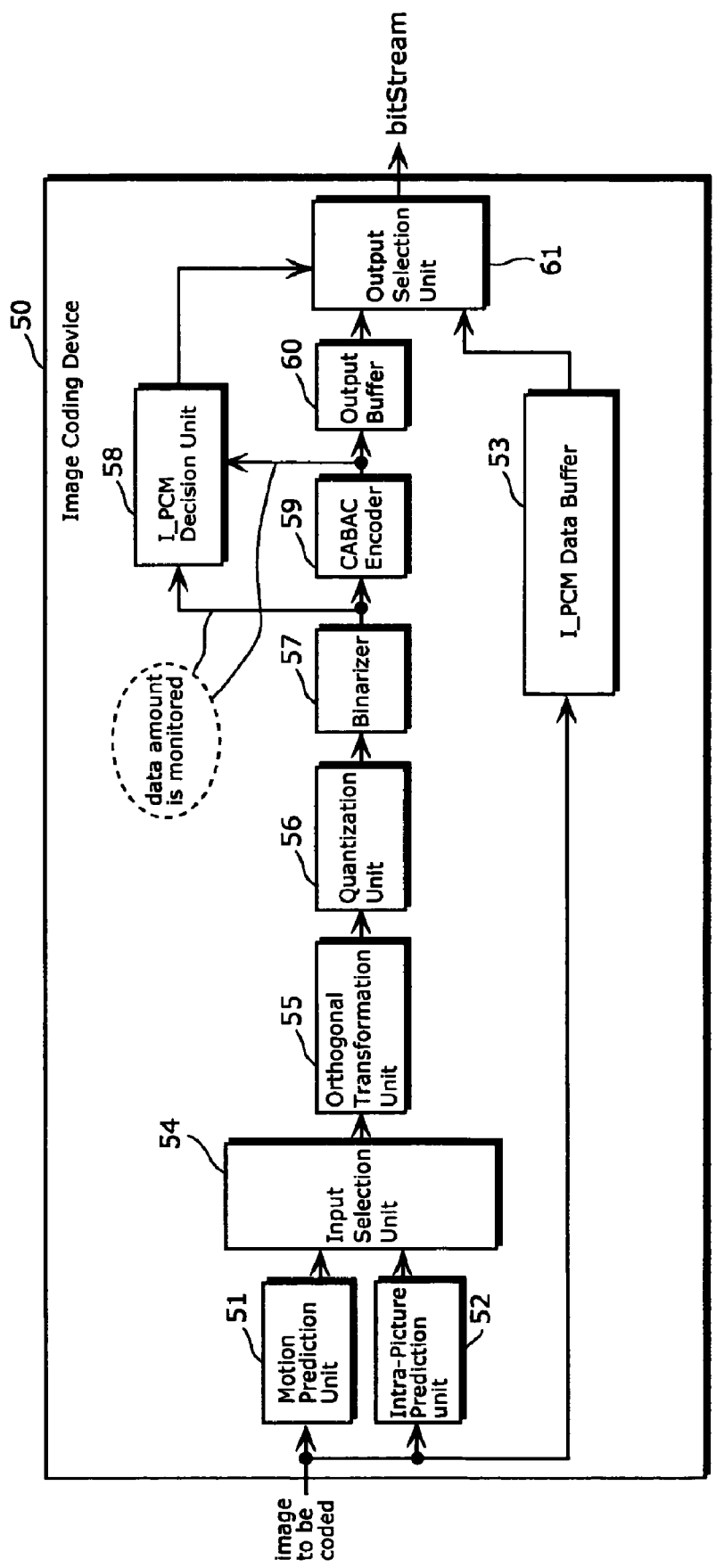
FIG. 1 is a block diagram showing a functional structure of the conventional image coding device.
Figure 2:
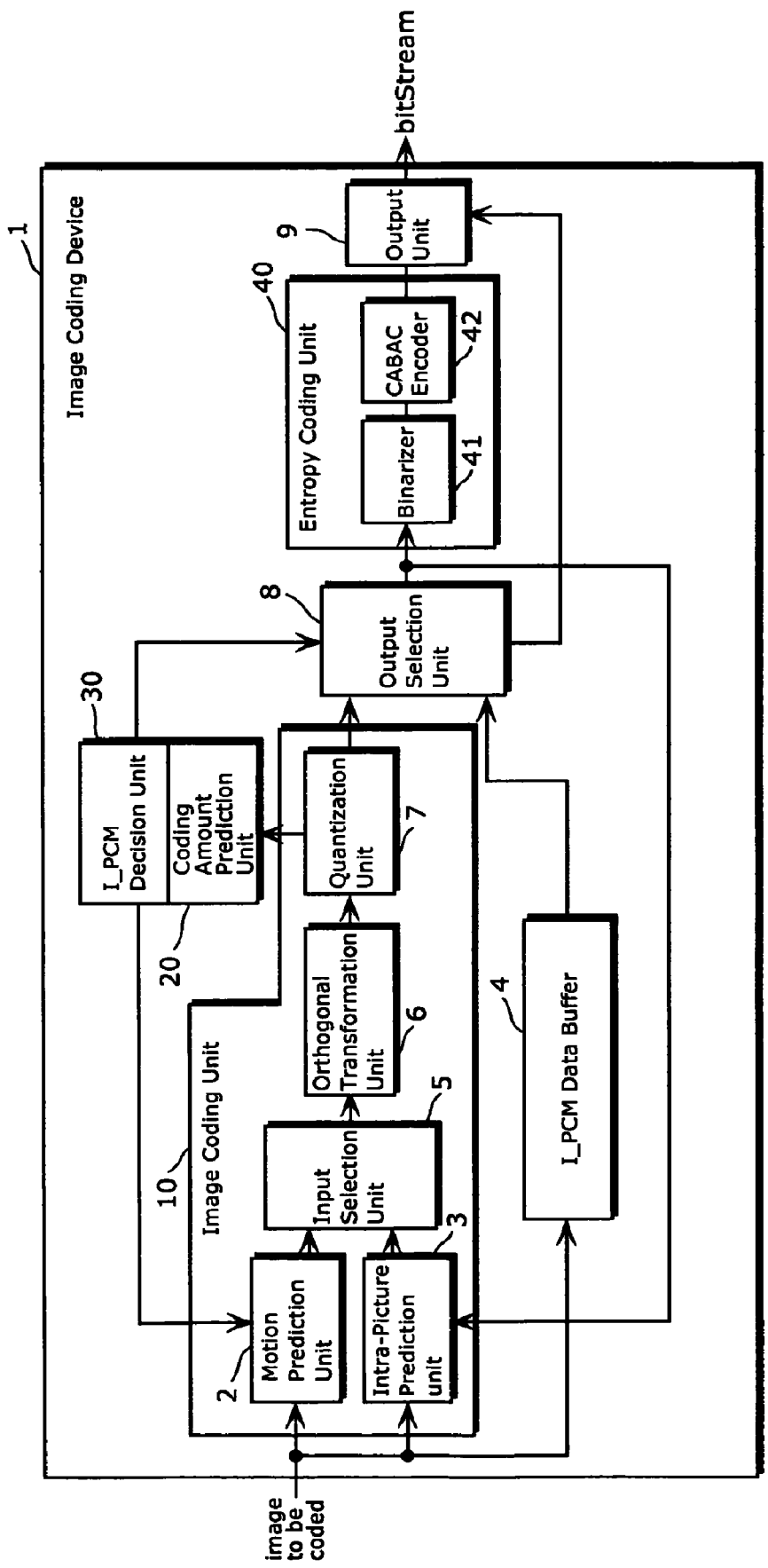
FIG. 2 is a schematic block diagram showing a basic functional structure of an image coding device according to the embodiment of the present invention.

FIG. 2 is a schematic block diagram showing a functional structure of an image coding device according to the embodiment of the present invention. Firstly, a basic structure and basic processing of the image coding device according to the embodiment of the present invention will be described with reference to FIGS. 2 and 3. Then, specific examples of the structure and processing will be described with reference to other drawings from FIG. 4.

An image coding device 1 shown in FIG. 2 is a device which codes image data and outputs the resulting coded data as a bitstream. Consistent with this embodiment of the present invention, the image coding device 1 can be implemented as an integrated circuit.

As shown in FIG. 2, the image coding device 1 has an image coding unit 10, an I_PCM data buffer 4, an output selection unit 8, an output unit 9, a coding amount prediction unit 20, an I_PCM decision unit 30, and an entropy coding unit 40.

The image coding unit 10 is a processing unit which codes inputted image data. The image coding unit 10 has a motion prediction unit 2, an intra-picture prediction unit 3, an input selection unit 5, an orthogonal transformation unit 6, and a quantization unit 7.

The entropy coding unit 40 is a processing unit which applies CABAC processing to the coded data obtained from the image coding unit 10. The entropy coding unit 40 has a binarizer 41 and a CABAC encoder 42.

Note that other units, which the image coding device originally has, such as units for inverse quantization, inverse orthogonal transformation, and the like, are not shown in FIG. 2 for simplification of the figure.

When the image coding device 1 receives an image data source to be coded, the data is passed to all of the motion prediction unit 2, the intra-picture prediction unit 3, and the I_PCM data buffer 4. This means that the I_PCM data buffer 4 holds original data of the picture, as I_PCM data. The input selection unit 5 selects output from the motion prediction unit 2 or output from the intra-picture prediction unit 3, and passes the selected output to the orthogonal transformation unit 6 which performs DCT processing. The orthogonal transformation unit 6 applies DCT to the obtained data and provides the resulting DCT coefficient to the quantization unit 7. The quantization unit 7 quantizes the DCT coefficient.

The above-described processing is the same as the processing described for the conventional image coding device. However, the image coding device 1 according to the embodiment of the present invention differs from the conventional image coding device in that the coding amount prediction unit 20 can predict a CABAC coding amount of each macroblock, prior to actual CABAC processing. A value of the predicted amount is hereinafter referred to as a "predictive value". The predictive value is calculated using a value of data coded by the image coding unit 10, such as the quantized DCT coefficient outputted from the quantization unit 7.

Here, the data provided to the coding amount prediction unit 20 is not limited to the output from the quantization unit 7, but may be any data by which the CABAC coding amount can be predicted.

Figure 3:
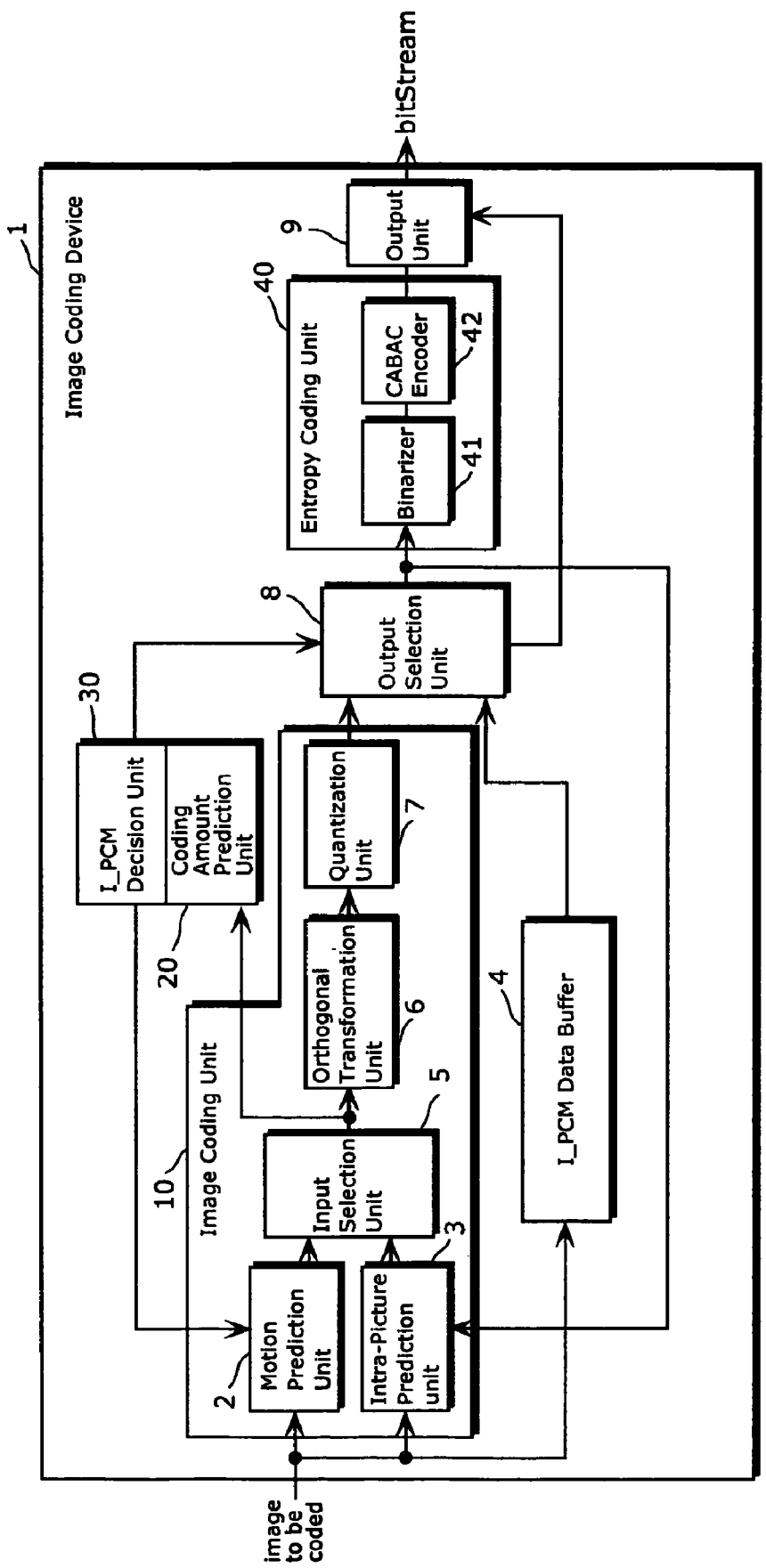
FIG. 3 is a schematic block diagram showing another example of the basic functional structure of the image coding device shown in FIG. 1.

FIG. 3 is a schematic block diagram showing another example of the basic functional structure of the image coding device 1 shown in FIG. 2.

The image coding device of FIG. 3 differs from the image coding device of FIG. 2 in that the data provided to the coding amount prediction unit 20 is not output from the quantization unit 7, but output from the input selection unit 5. This is because, the output from the input selection unit 5 is converted by the orthogonal transformation unit 6 and then the quantization unit 7, into data unique to output from the input selection unit 5, so that the results are the same in both cases. Here, however, a structure of the coding amount prediction unit 20 needs to be changed depending on the cases, in other words, when the output from the input selection unit 5 is provided or when the output from the quantization unit 7 is provided.

Note that the output from the input selection unit 5 is also one example of the data coded by the image coding device according to the present invention.

Referring back to FIG. 2 and, of course, FIG. 3, the I_PCM decision unit 30 holds a threshold value which is set regarding a coding amount, and compares a predictive value to the threshold value. Generation of the threshold value and the predictive value will be described in detail further below.

The I_PCM decision unit 30 controls the output selection unit 8, according to a result of the comparing. More specifically, if the predictive value is greater than the threshold value, the I_PCM decision unit 30 instructs the output selection unit 8 to select the I_PCM stored in the I_PCM data buffer 4. On the other hand, if the predictive value is equal to or less than the threshold value, the I_PCM decision unit 30 instructs the output selection unit 8 to select coded data outputted from the image coding unit 10.

Further, the I_PCM decision unit 30 notifies the motion prediction unit 2 of the result of the above comparing. How the motion prediction unit 2 operates after receiving the notification will be described further below in the tenth and eleventh examples.

Upon receipt of the instruction to select the I_PCM data, the output selection unit 8 obtains the I_PCM data from the I_PCM data buffer 4 and passes the obtained I_PCM data to the output unit 9. At the same time, the output selection unit 8 provides control information indicating "mb_type=I_PCM" to the entropy coding unit 40.

The entropy coding unit 40 codes only the received control information using the binarizer 41 and the CABAC encoder 42, and provides the resulting coded data to the output unit 9.

The output unit 9 outputs both of the I_PCM data obtained from the output selection unit 8 and the coded control information obtained from the entropy coding unit 40, to the outside as a bitstream.

On the other hand, upon receipt of the instruction to select the coded data, the output selection unit 8 obtains quantized coefficient data from the quantization unit 7, and passes the obtained data to the entropy coding unit 40.

The entropy coding unit 40 codes the received quantized coefficient data using the binarizer 41 and the CABAC encoder 42, and provides the resulting coded data to the output unit 9. The output unit 9 outputs the coded data obtained from the entropy coding unit 40 to the outsides as a bitstream.

Thus, the output selection unit 8 and the output unit 9 can output data based on the result of the comparing by the I_PCM decision unit 30, which is a characterized function of the image coding apparatus according to the present invention. This decision whether or not I_PCM data is to be outputted as a bitstream is hereinafter referred to as "I_PCM decision".

As described above, the image coding device 1 according to the present invention can decide, prior to entropy coding, whether an output bitstream is to be the I_PCM data or the coded data applied with the entropy coding.

Accordingly, this I_PCM decision, which is made on a macroblock-by-macroblock basis, can be performed at an earlier timing. Furthermore, when the I_PCM data, which is original data of the inputted image data, is eventually outputted as a bitstream, the entropy coding is not necessary. Therefore, by making decisions for necessary processing at an earlier timing, a processing speed is increased.

The following describes specific examples of the structure and processing of the image coding device 1, focusing the coding amount prediction unit 20 and the I_PCM decision unit 30.

First Example

Figure 4:
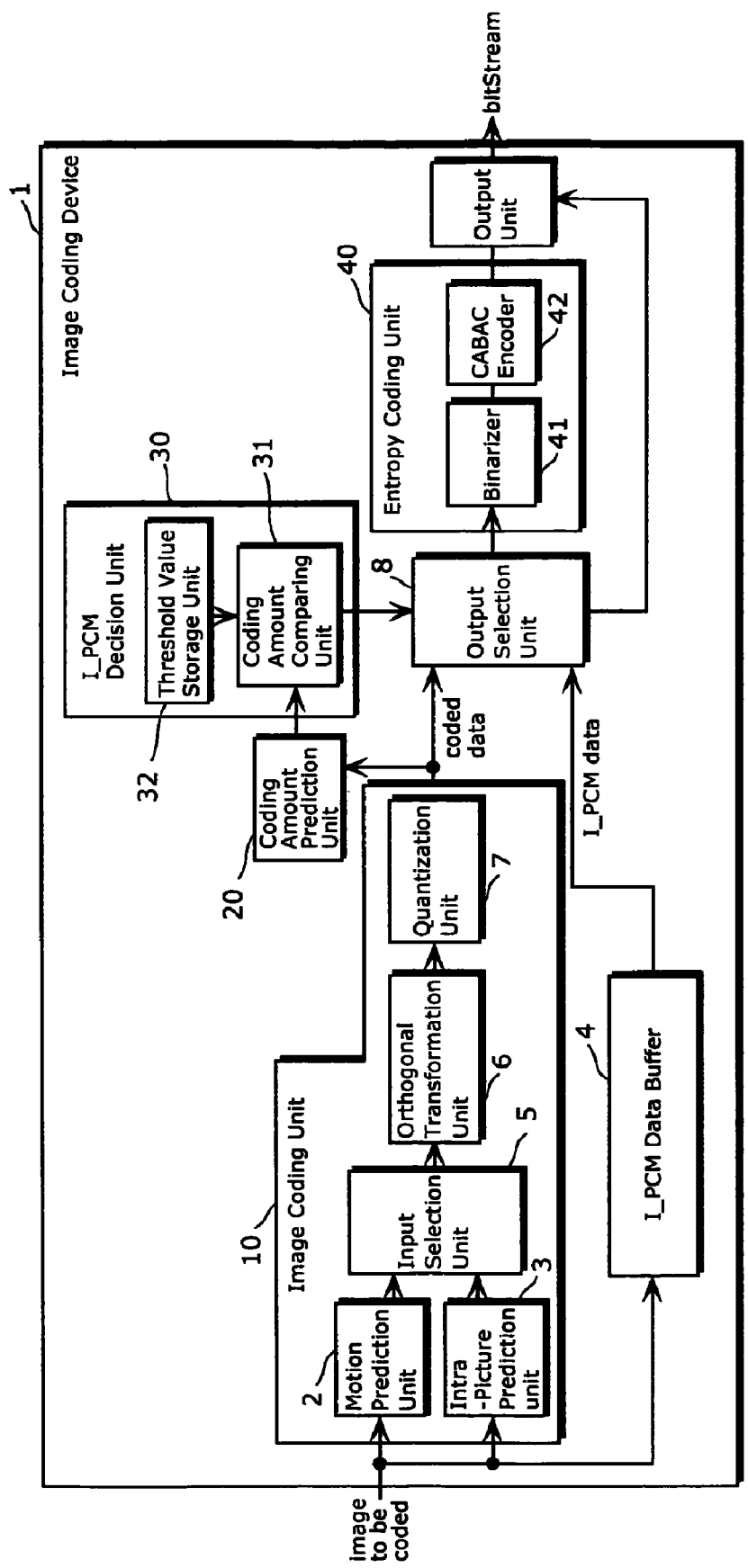
FIG. 4 is a block diagram showing the first example of the functional structure of the image coding device according to the embodiment of the present invention.

FIG. 4 is a block diagram showing the first example of the functional structure of the image coding device 1.

As shown in FIG. 4, the I_PCM decision unit 30 has a coding amount comparing unit 31 and a threshold value storage unit 32. Other units shown in FIG. 4 are identical to the units in FIG. 2.

The threshold value storage unit 32 is a storage unit, in which the threshold value regarding a coding amount is stored. The threshold value storage unit 32 is also an example of a non-transitory computer-readable recording medium. The threshold value is a reference value used for the I_PCM decision.

The coding amount comparing unit 31 is a processing unit which compares (i) a predictive value of a coding amount of each macroblock, which is received from the coding amount prediction unit 20, to (ii) the threshold value stored in the threshold value storage unit 32. As a result of the comparing, if the predictive value is greater than the threshold value, the coding amount comparing unit 31 instructs the output selection unit 8 to select the I_PCM data. On the other hand, if the predictive value is equal to or less than the threshold value, the coding amount comparing unit 31 instructs the output selection unit 8 to select the quantized coefficient and coding information (described in detail below) obtained from the image coding unit 10. The subsequent processing for the selected data is the same as the processing described referring to FIG. 2.

Note that the threshold value stored in the threshold value storage unit 32 is, for example, 3200 bits which the AVC/H.264 standard defines as a maximum amount available to code one macroblock (hereinafter, referred to as a "maximum coding amount"). Therefore, if in the image coding device 1 a macroblock whose coding amount is predicted to be over 3200 bits, I_PCM data is outputted as a bitstream.

Note also that the threshold value stored in the threshold value storage unit 32 is not limited to a value equivalent to the maximum coding amount of a macroblock defined by the AVC/H.264. The threshold value may be a value obtained by subtracting the maximum coding amount with a predetermined margin value, in order to improve security of the decision. Further, the value obtained by subtracting the maximum coding amount with the predetermined margin value has not been necessarily stored in the threshold value storage unit 32 beforehand as the threshold value. It is also possible that the threshold value storage unit 32 has the maximum coding amount as the threshold value, and the coding amount comparing unit 31 subtracts the margin value from the maximum coding amount, and compares the calculated value to the predictive value.

Note also that the I_PCM decision is not necessarily made on a macroblock-by-macroblock basis. The unit of data may be larger or smaller than a macroblock. For example, the unit of data may be changed depending on standards and the like of the entropy coding.

Second Example

Figure 5:
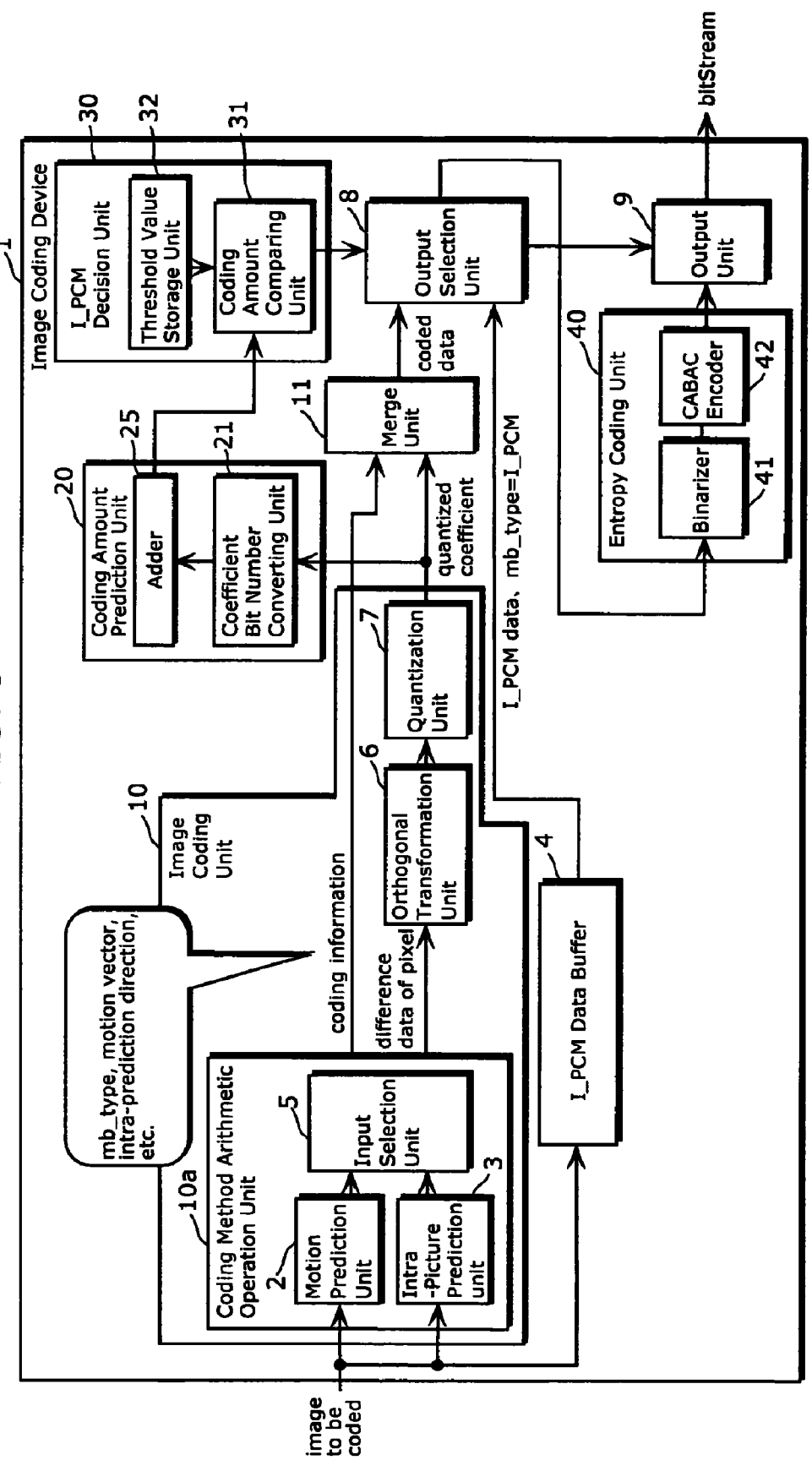
FIG. 5 is a block diagram showing the second example of the functional structure of the image coding device according to the embodiment of the present invention.

FIG. 5 is a block diagram showing the second example of the functional structure of the image coding device 1.

As shown in FIG. 5, the coding amount prediction unit 20 has a coefficient bit number converting unit 21 and an adder 25. Further, the motion prediction unit 2, the intra-picture prediction unit 3, and the input selection unit 5 form a coding method arithmetic operation unit 10*a* in the image coding device 1. Furthermore, a merge unit 11 is added.

The coding method arithmetic operation unit 10*a* generates, from the inputted image data, coding information and difference data per pixel, and outputs those data separately. The difference data per pixel is passed to firstly the orthogonal transformation unit 6, then the quantization unit 7, and the merge unit 11. The merge unit 11 merges the coding information and the quantized coefficient data which have been received separately.

Here, the coding information is information regarding coding of a macroblock. Examples of the coding information are a motion vector, mb_type, an intra-prediction direction, and the like, regarding a macroblock to be coded.

Other units shown in FIG. 5 are identical to the units in FIG. 4. As described above, the I_PCM decision unit 30 has a coding amount comparing unit 31 and the threshold value storage unit 32.

The coefficient bit number converting unit 21 is one example of a coefficient converting unit in the image coding device according to the present invention. The coefficient bit number converting unit 21 is a processing unit which converts a value of a quantized coefficient received from the quantization unit 7, to the number of bits of the quantized coefficient supposing that the quantized coefficient were binarized by the binarizer 41. Hereinafter, the number of bits is referred to as a "bit number".

More specifically, the coefficient bit number converting unit 21 has a conversion table shown in FIG. 6. Using the conversion table, values of quantized coefficients are converted into bit numbers.

FIG. 6 is one example of the conversion table used in the conversion of quantized coefficient values into bit numbers. As shown in FIG. 6, as a value of a quantized coefficient is given, a bit number associated with the value is decided.

The adder 25 adds the bit numbers outputted from the coefficient bit number converting unit 21 together on a macroblock-by-macroblock basis, and provides the resulting value to the I_PCM decision unit 30. This total bit number per macroblock generated by the adder 25 is hereinafter referred to as a "coefficient bit number". That is, the coefficient bit number is provided to the I_PCM decision unit 30 as a predictive value.

In the I_PCM decision unit 30, the threshold value storage unit 32 holds a threshold value for performing the I_PCM decision. The threshold value is calculated using the coefficient bit number received from the coding amount prediction unit 20. In other words, the predictive value outputted from the coding amount prediction unit 20 is not (i) a predictive value of a coding amount of data per macroblock supposing that the data were applied with CABAC, but (ii) a predictive value of a bit number of data per macroblock supposing that the data were binarized but not yet applied with the CABAC. Therefore, the threshold value storage unit 32 holds a threshold value associated with the bit number.

The coding amount comparing unit 31 compares (i) the predictive value of the coefficient bit number received from the coding amount prediction unit 20, to (ii) the threshold value stored in the threshold value storage unit 32. If the predictive value is greater than the threshold value, the coding amount comparing unit 31 instructs the output selection unit 8 to select I_PCM data. On the other hand, if the predictive value is equal to or less than the threshold value, the coding amount comparing unit 31 instructs the output selection unit 8 to select coded data outputted from the image coding unit 10. The subsequent processing for the selected data is the same as the processing described referring to FIG. 2.

Accordingly, in the image coding device 1 shown in FIG. 5, it is possible to set, as the predictive value, the bit number of all quantized coefficients in a macroblock to be coded supposing that the quantized coefficients were binarized. Further, by comparing a threshold value to the predictive value, the I_PCM decision is made on a macroblock-by-macroblock basis.

Note that it has been described that the coefficient bit number converting unit 21 converts the quantized coefficient values to the bit numbers, referring to the conversion table shown in FIG. 6. However, the conversion may be performed using other means except the conversion table, for example, using mathematical functions by which the same conversion result can be obtained. In the following, any conversion using the conversion table may, of course, be performed using other means, as described above.

Third Example

Figure 7:
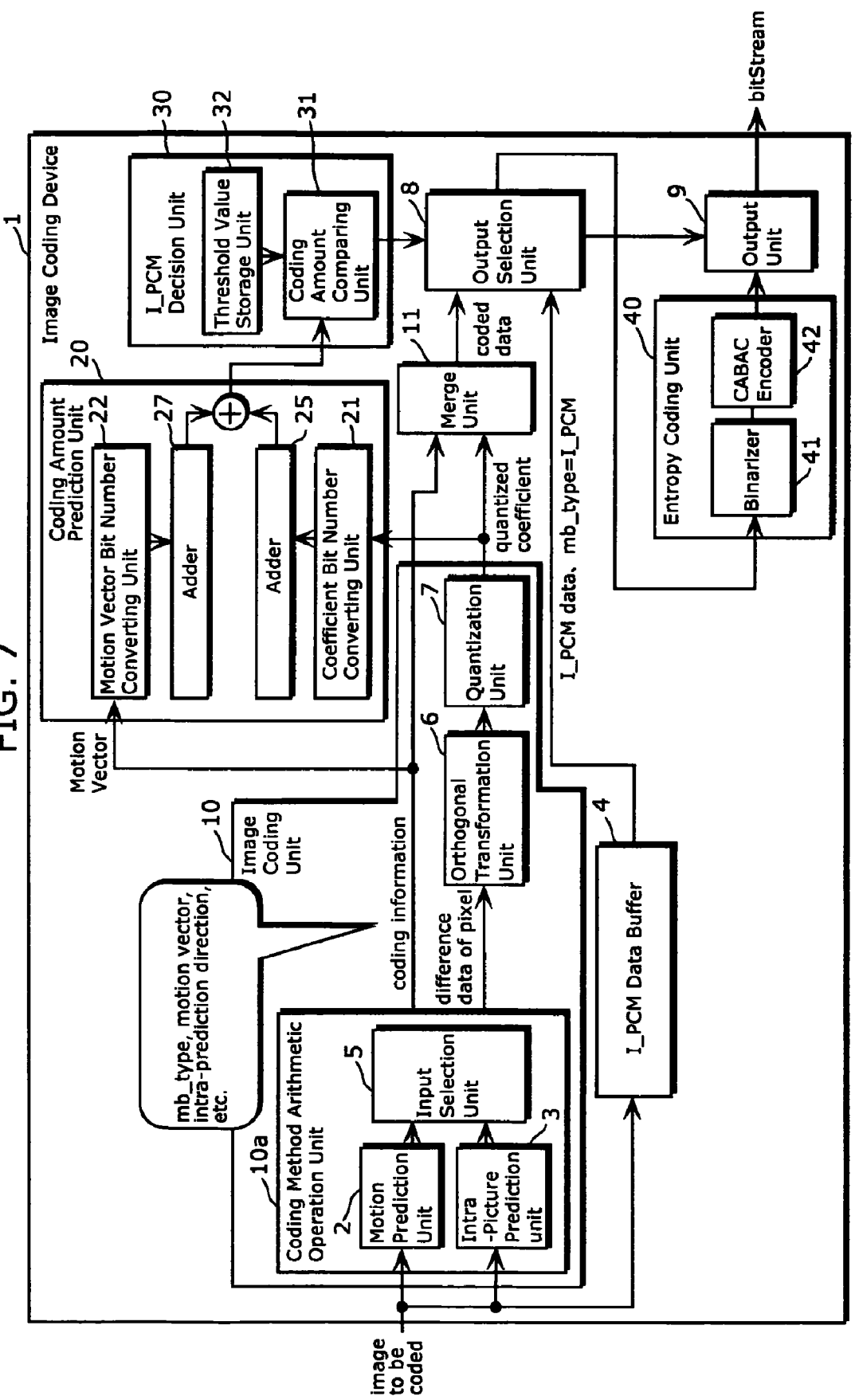
FIG. 7 is a block diagram showing the third example of the functional structure of the image coding device according to the embodiment of the present invention.

FIG. 7 is a block diagram showing the third example of the functional structure of the image coding device 1.

The structure of the image coding device 1 of FIG. 7 differs from the structure of the image coding device 1 of FIG. 5 in that the coding amount prediction unit 20 has a motion vector bit number converting unit 22 and an adder 27.

The motion vector bit number converting unit 22 is one example of a motion converting unit in the image coding device of the present invention. The motion vector bit number converting unit 22 is a processing unit which obtains a motion vector from the coding information outputted from the coding method arithmetic operation unit 10a, and converts the obtains motion vector to the bit number of the motion vector supposing that the motion vector were binarized by the binarizer 41. This conversion is performed using the conversion table as shown in FIG. 6. That is, the motion vector bit number converting unit 22 has the conversion table, in which a value of a motion vector is associated with a bit number of supposed binary data, and if a certain motion vector is given, a bit number associated with the motion vector is decided. Using the conversion table, the motion vector is converted to the bit number of the motion vector supposing that the motion vector were binarized by the binarizer 41.

The adder 27 adds the bit numbers outputted from the motion vector bit number converting unit 22 together on a macroblock-by-macroblock basis. This total bit number per macroblock generated by the adder 27 of FIG. 7 is hereinafter referred to as a "motion vector bit number". On the other hand, the adder 25 adds the bit numbers outputted from the coefficient bit number converting unit 21 together on a macroblock-by-macroblock basis. Then, a sum of the coefficient bit number from the adder 25 and the motion vector bit number from the adder 27 is outputted to the I_PCM decision unit 30. That is, the sum of the coefficient bit number and the motion vector bit number is outputted to the I_PCM decision unit 30 as a predictive value.

In the I_PCM decision unit 30, the threshold value storage unit 32 holds a threshold value used in the I_PCM decision. The threshold value is determined using the sum of the coefficient bit number and the motion vector bit number. In other words, the threshold value storage unit 32 holds a threshold value corresponding to the sum of the coefficient bit number and the motion vector bit number outputted from the coding amount prediction unit 20, as a predictive value.

The coding amount comparing unit 31 compares (i) the predictive value which is the sum of the coefficient bit number and the motion vector bit number received from the coding amount prediction unit 20, to (ii) the threshold value stored in the threshold value storage unit 32. If the predictive value is larger than the threshold value, the coding amount comparing unit 31 instructs the output selection unit 8 to select the I_PCM data. On the other hand, if the predictive value is equal to or less than the threshold value, the coding amount comparing unit 31 instructs the output selection unit 8 to select the coded data outputted from the image coding unit 10. The subsequent processing for the selected data is the same as the processing described referring to FIG. 2.

Accordingly, in the image coding device 1 shown in FIG. 7, it is possible to set, as the predictive value, a sum value of (i) the bit number of all quantized coefficients in a macroblock to be coded supposing that the quantized coefficients were binarized and (ii) the bit number of all motion vectors in the macroblock supposing that the motion vectors were binarized. Thereby, as compared to the image coding device 1 shown in FIG. 5, the predictive value of the image coding device 1 of FIG. 7 is closer to an actual bit number after the macroblock is actually binarized. Furthermore, by comparing a threshold value with the predictive value, the I_PCM decision can be made on a macroblock-by-macroblock basis.

Fourth Example

Figure 8:
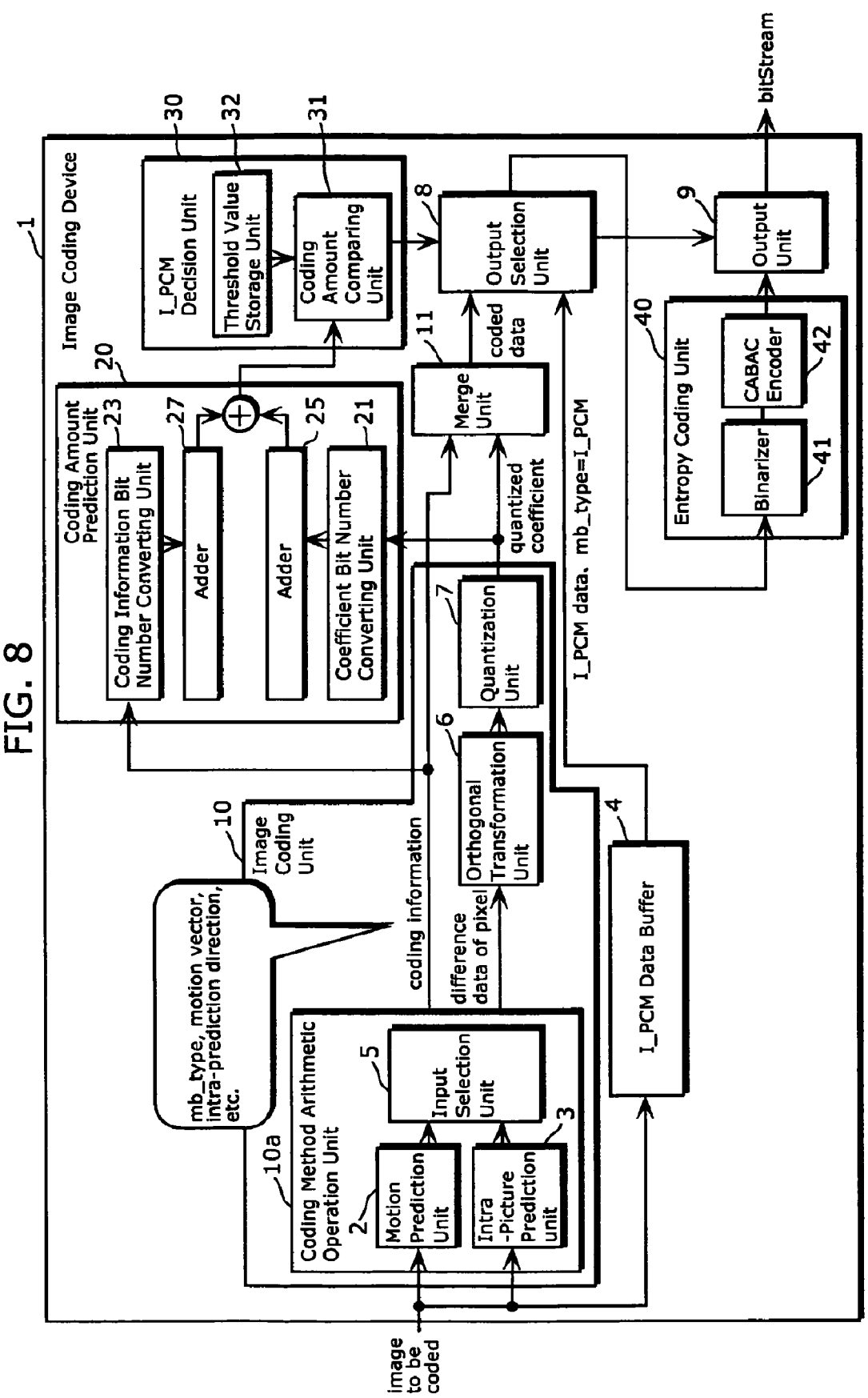
FIG. 8 is a block diagram showing the fourth example of the functional structure of the image coding device according to the embodiment of the present invention.

FIG. 8 is a block diagram showing the fourth example of the functional structure of the image coding device 1.

The structure of the image coding device 1 of FIG. 8 differs from the structure of the image coding device 1 of FIG. 7 in that the coding amount prediction unit 20 has a coding information bit number converting unit 23 instead of the motion vector bit number converting unit 22.

The coding information bit number converting unit 23 is a processing unit which obtains the coding information from the coding method arithmetic operation unit 10a, and converts the obtained coding information to a bit number of the coding information supposing that the coding information including a motion vector were binarized by the binarizer 41. In other words, the coding information bit number converting unit 23 is a processing unit which outputs (i) the bit number of a motion vector supposing that the motion vector were binarized, and (ii) the bit number of coding information except the motion vector supposing that the coding information were binarized. That is, the coding information bit number converting unit 23 serves also as the motion vector bit number converting unit 22.

Note that the coding information bit number converting unit 23 can realize a function of obtaining the bit number of target data supposing that the target data were binarized, which is functions of both the motion converting unit and the coding information converting unit of the image coding device according to the present invention.

This conversion is performed using the conversion table as shown in FIG. 6. That is, the coding information bit number converting unit 23 has a conversion table, in which a value of each coding information is associated with a bit number of supposed binary data, and if certain coding information is given, a bit number associated with the coding information is decided. The coding information is, for example, a motion vector and mb_type. Using the conversion table, the coding information is converted to the bit number of the coding information supposing that the coding information were binarized by the binarizer 41.

The adder 27 adds the bit numbers outputted from the coding information bit number converting unit 23 together on a macroblock-by-macroblock basis. This total bit number per macroblock generated by the adder 27 of FIG. 8 is hereinafter referred to as a "coding information bit number". On the other hand, the adder 25 adds the bit numbers outputted from the coefficient bit number converting unit 21 together on a macroblock-by-macroblock basis.

Then, a sum of the coefficient bit number from the adder 25 and the coding information bit number from the adder 27 is outputted to the I_PCM decision unit 30. That is, the sum of the coefficient bit number and the coding information bit number is provided to the I_PCM decision unit 30 as a predictive value.

In the image coding device 1 of FIG. 7, the predictive value is the sum of the bit numbers of the coefficients and the motion vectors of each macroblock supposing that the coefficients and the motion vectors were binarized. However, in the image coding device 1 of FIG. 8, the above predictive value is further added with the bit number of coding information except the motion vectors, such as mb_type, of each macroblock supposing that the coding information were binarized.

In the I_PCM decision unit 30, the threshold value storage unit 32 holds a threshold value used in the I_PCM decision. The threshold value is determined using the sum of the coefficient bit number and the coding information bit number. That is, the threshold value storage unit 32 holds a threshold value corresponding to the sum of the coefficient bit number and the coding information bit number outputted from the coding amount prediction unit 20, as a predictive value.

The coding amount comparing unit 31 compares (i) the predictive value which is the sum of the coefficient bit number and the coding information bit number received from the coding amount prediction unit 20, to (ii) the threshold value stored in the threshold value storage unit 32. If the predictive value is larger than the threshold value, the coding amount comparing unit 31 instructs the output selection unit 8 to select the I_PCM data. On the other hand, if the predictive value is equal to or less than the threshold value, the coding amount comparing unit 31 instructs the output selection unit 8 to select the coded data outputted from the image coding unit 10. The subsequent processing for the selected data is the same as the processing described referring to FIG. 2.

Accordingly, in the image coding device 1 shown in FIG. 8, it is possible to set, as the predictive value, a sum value of (i) the bit number of all quantized coefficients in a macroblock to be coded supposing that the quantized coefficients were binarized, (ii) the bit number of all motion vectors in the macroblock supposing that the motion vectors were binarized, and (iii) the bit number of all coding information, except the motion vectors, in the macroblock supposing that the coding information were binarized. Thereby, as compared to the image coding device 1 shown in FIG. 7, the predictive value of the image coding device 1 of FIG. 8 is closer to an actual bit number after the macroblock is actually binarized. Furthermore, by comparing the threshold value with the predictive value, the I_PCM decision can be made on a macroblock-by-macroblock basis.

Fifth Example

Figure 9:
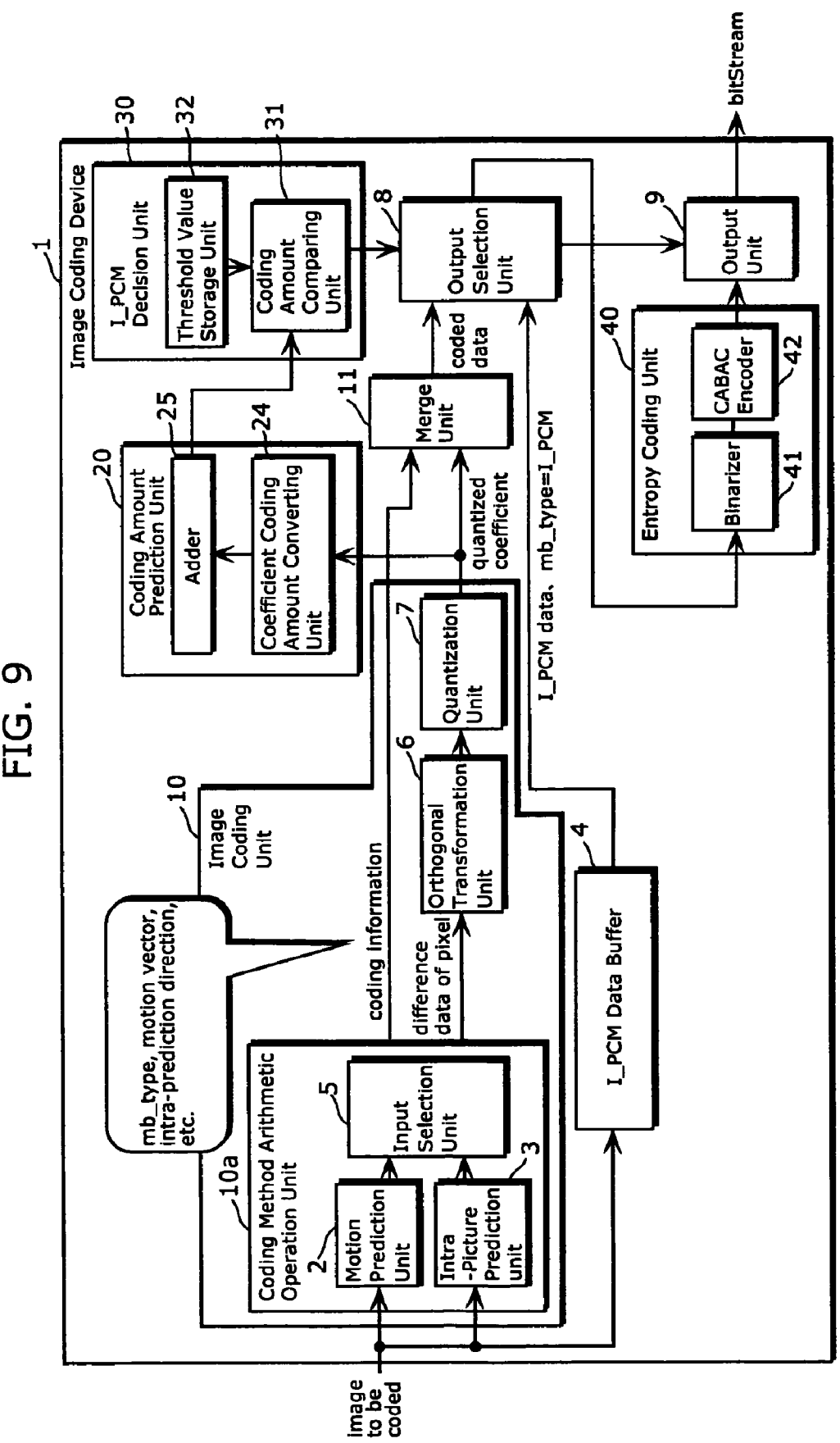
FIG. 9 is a block diagram showing the fifth example of the functional structure of the image coding device according to the embodiment of the present invention.

FIG. 9 is a block diagram showing the fifth example of the functional structure of the image coding device 1.

The structure of the image coding device 1 of FIG. 9 differs from the structure of the image coding device 1 of FIG. 5 in that the coding amount prediction unit 20 has a coefficient coding amount converting unit 24 instead of the coefficient bit number converting unit 21.

The coefficient coding amount converting unit 24 is one example of a coefficient converting unit in the image coding device of the present invention. The coefficient coding amount converting unit 24 is a processing unit which converts a value of the quantized coefficient received from the quantization unit 7 to a coding amount of the quantized coefficient supposing that the quantized coefficient were binarized and then applied with CABAC by the CABAC encoder 42. The resulting converted value is outputted as a predictive value.

That is, the coding amount prediction unit 20 of FIG. 9 differs from the above-described coding amount prediction unit 20 of FIGS. 5, 7, and 8, in that the predictive value is not the bit number supposing that the quantized coefficients of each macroblock were binarized, but a coding amount supposing that the quantized coefficients of each macroblock were binarized and then applied with CABAC.

The coefficient coding amount converting unit 24 has a conversion table, mathematical functions, or the like, by which a value of a quantized coefficient is associated with a bit number of supposed binary data, and if a certain quantized coefficient is given, a bit number associated with the quantized coefficient is decided. Using the conversion table, the quantized coefficient is converted to the bit number of the quantized coefficient supposing that the quantized coefficient were applied with CABAC. These conversion table, mathematical functions, and the like are determined by experiment values or theoretical values. The motion vector coding amount converting unit 26 and the coding information coding amount converting unit 28 also converts respective received data to respective coding amounts using the same conversion table or functions. The motion vector coding amount converting unit 26 and the coding information coding amount converting unit 28 will be described in detail further below with reference to FIGS. 10 and 11.

The adder 25 adds the coding amounts received from the coefficient coding amount converting unit 24 together on a macroblock-by-macroblock basis. This total coding amount per macroblock generated by the adder 25 of FIG. 9 is hereinafter referred to as a "coefficient coding amount". That is, the coefficient coding amount is provided to the I_PCM decision unit 30 as a predictive value.

In the I_PCM decision unit 30, the threshold value storage unit 32 holds a threshold value used in the I_PCM decision. The threshold value is determined using the coefficient coding amount outputted from the coding amount prediction unit 20. The predictive value outputted from the coding amount prediction unit 20 is a predictive value of coding amounts of quantized coefficients of each macroblock supposing that the quantized coefficients were applied with CABAC. The threshold value storage-unit 32 holds a threshold value corresponding to the predictive value. For example, the threshold value is equal to or less than 3200 bits that is, as stated previously, a maximum coding amount defined by the AVC/H.264 standard.

The coding amount comparing unit 31 compares (i) the predictive value which is the coefficient coding amount received from the coding amount prediction unit 20, to (ii) the threshold value stored in the threshold value storage unit 32.

If the predictive value is larger than the threshold value, the coding amount comparing unit 31 instructs the output selection unit 8 to select the I_PCM data. On the other hand, if the predictive value is equal to or less than the threshold value, the coding amount comparing unit 31 instructs the output selection unit 8 to select the coded data outputted from the image coding unit 10. The subsequent processing for the selected data is the same as the processing described referring to FIG. 2.

Accordingly, in the image coding device 1 shown in FIG. 9, it is possible to set, as a predictive value, the coding amount of all quantized coefficients in a macroblock to be coded supposing that the quantized coefficient were binarized and then applied with CABAC. Furthermore, by comparing the threshold value with the predictive value, the I_PCM decision can be made on a macroblock-by-macroblock basis.

Sixth Example

Figure 10:
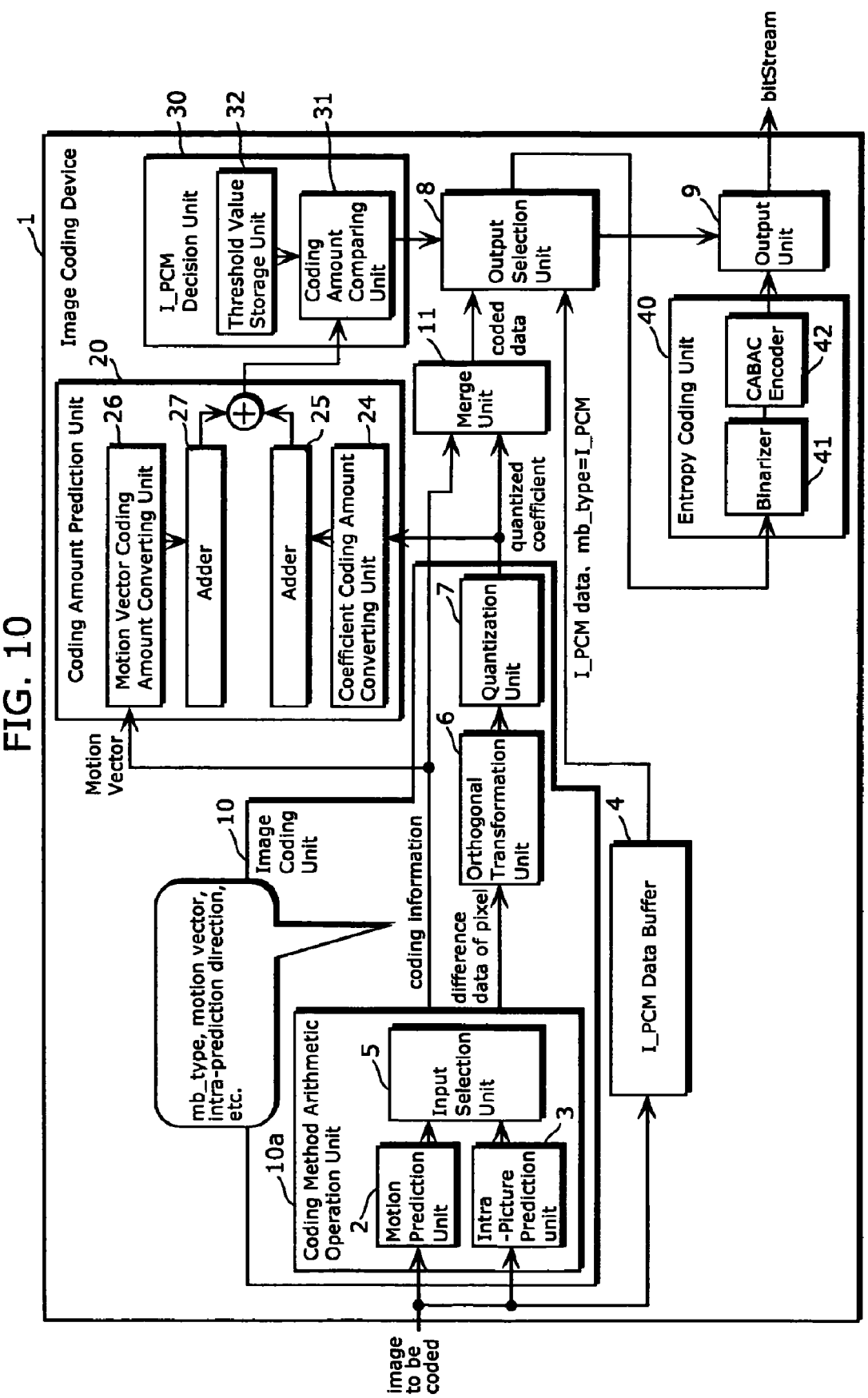
FIG. 10 is a block diagram showing the sixth example of the functional structure of the image coding device according to the embodiment of the present invention.

FIG. 10 is a block diagram showing the sixth example of the functional structure of the image coding device 1.

The structure of the image coding device 1 of FIG. 10 differs from the structure of the image coding device 1 of FIG. 9 in that the coding amount prediction unit 20 further has a motion vector coding amount converting unit 26 and an adder 27.

The motion vector coding amount converting unit 26 is another example of the motion converting unit in the image coding device of the present invention. The motion vector coding amount converting unit 26 is a processing unit which obtains a motion vector from the coding information outputted from the coding method arithmetic operation unit 10*a*, and converts the obtained motion vector to a coding amount of the motion vector supposing that the motion vector were binarized and then applied with CABAC by the CABAC encoder 42. This conversion is performed using the conversion table or mathematical functions as described previously.

The adder 27 adds the coding amounts outputted from the motion vector coding amount converting unit 26 together on a macroblock-by-macroblock basis. This total coding amount per macroblock generated by the adder 27 of FIG. 10 is hereinafter referred to as a "motion vector coding amount". On the other hands, the adder 25 adds the coding amounts outputted from the coefficient coding amount converting unit 24 together on a macroblock-by-macroblock basis. Then, a sum of the coefficient coding amount from the adder 25 and the motion vector coding amount from the adder 27 is outputted to the I_PCM decision unit 30. That is, the sum of the coefficient coding amount and the motion vector coding amount is provided to the I_PCM decision unit 30 as a predictive value In the I_PCM decision unit 30, the threshold value storage unit 32 holds a threshold value used in the I_PCM decision. The threshold value is determined using the sum of the coefficient coding amount and the motion vector coding amount.

That is, the threshold value storage unit 32 holds a threshold value corresponding to the sum of the coefficient coding amount and the motion vector coding amount outputted from the coding amount prediction unit 20, as a predictive value. For example, the threshold value is equal to or less than 3200 bits that is, as stated previously, a maximum coding amount defined by the AVC/H.264 standard.

The coding amount comparing unit 31 compares (i) the predictive value which is the sum of the coefficient coding amount and the motion vector coding amount outputted from the coding amount prediction unit 20, to (ii) the threshold value stored in the threshold value storage unit 32. If the predictive value is larger than the threshold value, the coding amount comparing unit 31 instructs the output selection unit 8 to select the I_PCM data. On the other hand, if the predictive value is equal to or less than the threshold value, the coding amount comparing unit 31 instructs the output selection unit 8 to select the coded data outputted from the image coding unit 10. The subsequent processing for the selected data is the same as the processing described referring to FIG. 2.

Accordingly, in the image coding device 1 shown in FIG. 10, it is possible to set, as a predictive value, a sum value of (i) the coding amount of all quantized coefficients in a macroblock to be coded supposing that the quantized coefficients were binarized and then applied with CABAC and (ii) the coding amount of all motion vectors in the macroblock supposing that the motion vectors were binarized and then applied with CABAC. Thereby, as compared to the image coding device 1 shown in FIG. 9, the predictive value of the image coding device 1 of FIG. 10 is closer to an actual coding amount after the macroblock is actually applied with the CABAC. Furthermore, by comparing a threshold value with the predictive value, the I_PCM decision can be made on a macroblock-by-macroblock basis.

Seventh Example

Figure 11:
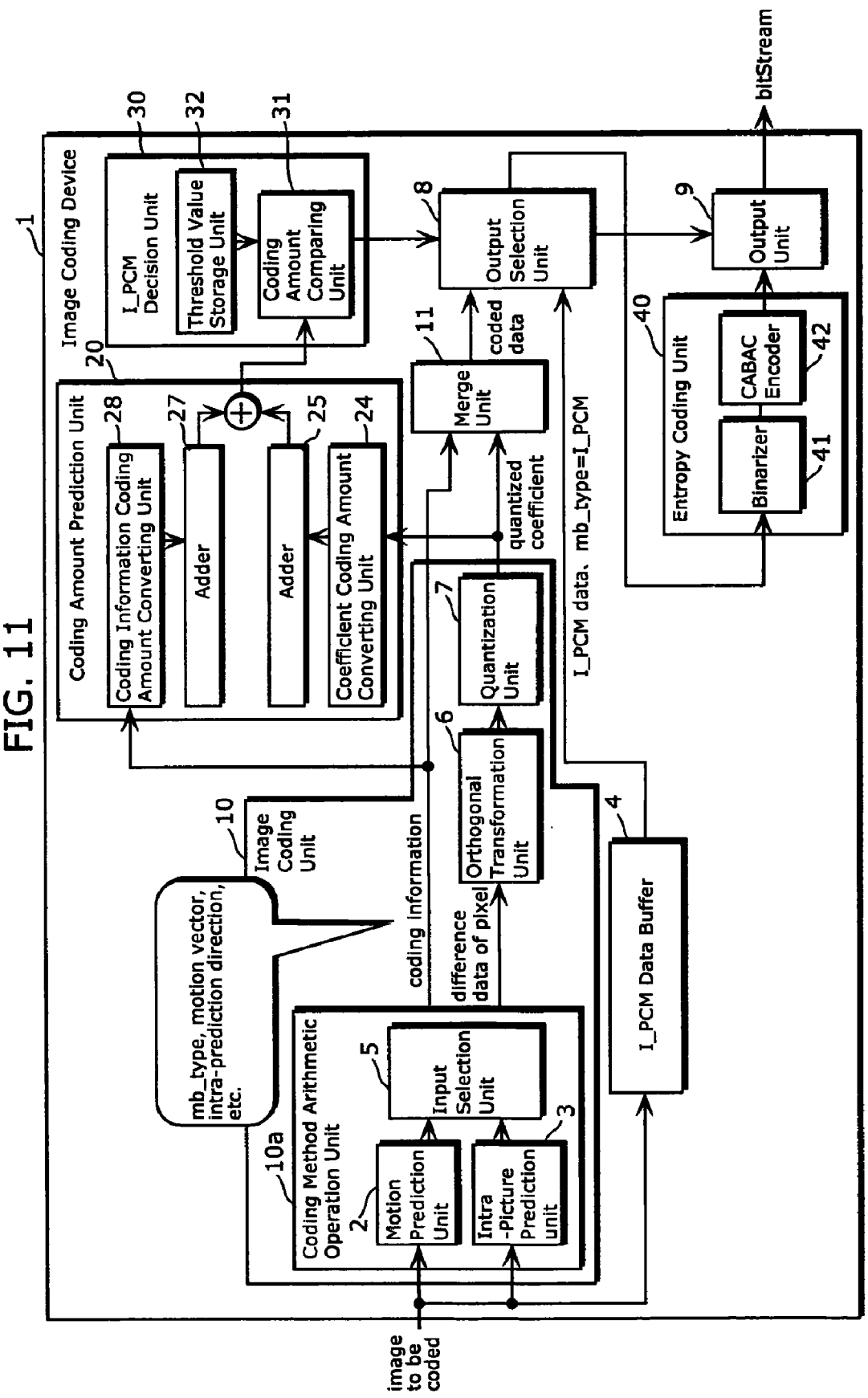
FIG. 11 is a block diagram showing the seventh example of the functional structure of the image coding device according to the embodiment of the present invention.

FIG. 11 is a block diagram showing the seventh example of the functional structure of the image coding device 1.

The structure of the image coding device 1 of FIG. 11 differs from the structure of the image coding device 1 of FIG. 10 in that the coding amount prediction unit 20 has a coding information coding amount converting unit 28 instead of the motion vector coding amount converting unit 26.

The coding information coding amount converting unit 28 is a processing unit which obtains the coding information outputted from the coding method arithmetic operation unit 10*a*, and converts the obtained coding information, including a motion vector, to a coding amount of the coding information supposing that the coding information were binarized and then applied with CABAC by the CABAC encoder 42. In other words, the coding information coding amount converting unit 28 is a processing unit which outputs (i) a coding amount of a motion vector supposing that the motion vector were applied with CABAC, and (ii) a coding amount of the coding information except the motion vector supposing that the coding information were applied with CABAC. That is, the coding information coding amount converting unit 28 serves also as the motion vector coding amount converting unit 26 shown in FIG. 10.

Note that the coding information coding amount converting unit 28 can realize a function of obtaining a coding amount of target data supposing that the target data were applied with entropy coding, which is functions of both the motion converting unit and the coding information converting unit of the image coding device according to the present invention.

This conversion is performed using the conversion table or mathematical functions as described previously.

The adder 27 adds the coding amounts outputted from the coding information coding amount converting unit 28 together on a macroblock-by-macroblock basis. This total coding amount per macroblock generated by the adder 27 of FIG. 11 is hereinafter referred to as a "coding information coding amount". On the other hands, the adder 25 adds the coding amounts outputted from the coefficient coding amount converting unit 24 together on a macroblock-by-macroblock basis. Then, a sum of: the coefficient coding amount from the adder 25; and the coding information coding amount and the motion vector coding amount from the adder 27 is outputted to the I_PCM decision unit 30. That is, the sum of the coefficient coding amount and the coding information coding amount is provided to the I_PCM decision unit 30 as a predictive value.

In the image coding device 1 of FIG. 10, the predictive value is the sum of the coding amounts of the coefficients and the motion vectors of each macroblock supposing that the coefficients and the motion vectors were applied with CABAC. However, in the image coding device 1 of FIG. 11, the above predictive value is further added with the coding amount of coding information except the motion vectors, such as mb_type, of each macroblock supposing that the coding information were applied with CABAC.

In the I_PCM decision unit 30, the threshold value storage unit 32 holds a threshold value used in the I_PCM decision. The threshold value is determined using the sum of the coefficient coding amount and the coding information coding amount. That is, the threshold value storage unit 32 holds a threshold value corresponding to the sum of the coefficient coding amount and the coding information coding amount outputted from the coding amount prediction unit 20, as a predictive value.

The coding amount comparing unit 31 compares (i) the predictive value which is the sum of the coefficient coding amount and the coding information coding amount outputted from the coding amount prediction unit 20, to (ii) the threshold value stored in the threshold value storage unit 32. If the predictive value is larger than the threshold value, the coding amount comparing unit 31 instructs the output selection unit 8 to select the I_PCM data. On the other hand, if the predictive value is equal to or less than the threshold value, the coding amount comparing unit 31 instructs the output selection unit 8 to select the coded data outputted from the image coding unit 10. The subsequent processing for the selected data is the same as the processing described referring to FIG. 2.

Accordingly, in the image coding device 1 shown in FIG. 11, it is possible to set, as a predictive value, a sum value of (i) the coding amount of all quantized coefficients in a macroblock to be coded supposing that the quantized coefficients were binarized and then applied with CABAC, (ii) the coding amount of all motion vectors in the macroblock supposing that the motion vectors were binarized and then applied with CABAC, and (iii) the coding amount of all coding information, except the motion vectors, in the macroblock supposing that the coding information were binarized and then applied with CABAC. Thereby, as compared to the image coding device 1 shown in FIG. 10, the predictive value of the image coding device 1 of FIG. 11 is closer to an actual coding amount after the macroblock is actually applied with the CABAC. Furthermore, by comparing a threshold value with the predictive value, the I_PCM decision can be made on a macroblock-by-macroblock basis.

Eighth Example

Figure 12:
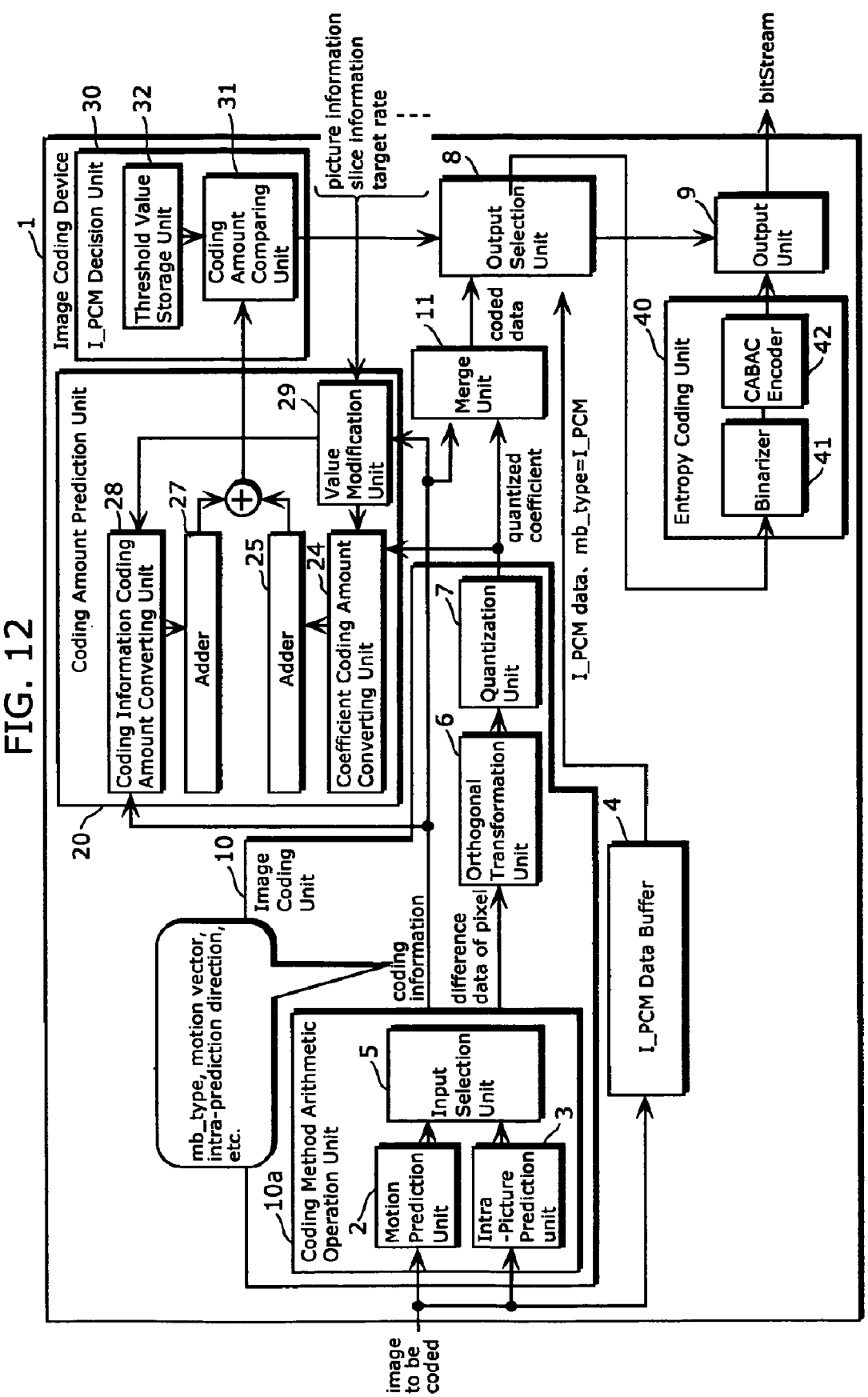
FIG. 12 is a block diagram showing the eighth example of the functional structure of the image coding device according to the embodiment of the present invention.

FIG. 12 is a block diagram showing the eighth example of the functional structure of the image coding device 1.

The structure of the image coding device 1 of FIG. 12 differs from the structure of the image coding device 1 of FIG. 11 in that the coding amount prediction unit 20 further has a value modification unit 29.

The value modification unit 29 is a processing unit which obtains coding conditions under which the entropy coding is applied to a macroblock to be coded, and according to the coding conditions, modifies the predictive value obtained from the coding amount prediction unit 20.

Examples of the macroblock coding conditions are a type of a picture (I, P, or B) in which the target macroblock is included, mb_type, a type of a residual block (residual_block), a quantization parameter, a target output rate, and the like. Depending on these coding conditions, a coding amount after CABAC varies. Therefore, the value modification unit 29 modifies the predictive value to deal with the variation.

More specifically, the coefficient coding amount converting unit 24 and the coding information coding amount converting unit 28 hold respective conversion tables or mathematical functions in order to convert input information to each coding amount. According to the above-described coding conditions, the value modification unit 29 re-writes the conversion tables or mathematical functions.

These coding conditions can obtain from, for example, picture information or slice information, and the picture information or the slice information can obtain from a slice header, SPS, or PPS. The picture information or the slice information is provided to the value modification unit 29 using a predetermined means. On the other hand, the target output rate is inputted by a user of the image coding device 1 into the image coding device 1 using a predetermined means. Then, a value of the output rate is passed to the value modification unit 29.

Thereby, respective coding amounts outputted from the coefficient coding amount converting unit 24 and the coding information coding amount converting unit 28 are modified according to the coding conditions for the macroblock to be coded. The adder 27 adds coding amounts outputted from the coding information coding amount converting unit 28 together to be outputted as a modified coding information coding amount. On the other hand, the adder 25 adds coding amounts outputted from the coefficient coding amount converting unit 24 together to be outputted as a modified coefficient coding amount. Then, a sum of the coefficient coding amount and the coding information coding amount is provided to the I_PCM decision unit 30 as a predictive value.

In the I_PCM decision unit 30, the threshold value storage unit 32 holds a threshold value used in the I_PCM decision. The threshold value is determined using the sum of the coefficient coding amount and the coding information coding amount outputted from the coding amount prediction unit 20. For example, the threshold value is 3200 bits that is, as stated previously, a maximum coding amount defined by the AVC/H.264 standard.

The coding amount comparing unit 31 compares (i) the predictive value which is the sum of the coefficient coding amount and the coding information coding amount received from the coding amount prediction unit 20, to (ii) the threshold value stored in the threshold value storage unit 32. If the predictive value is larger than the threshold value, the coding amount comparing unit 31 instructs the output selection unit 8 to select the I_PCM data. On the other hand, if the predictive value is equal to or less than the threshold value, the coding amount comparing unit 31 instructs the output selection unit 8 to select the coded data outputted from the image coding unit 10. The subsequent processing for the selected data is the same as the processing described referring to FIG. 2.

Accordingly, in the image coding device 1 shown in FIG. 12, like the image coding device 1 shown in FIG. 11, it is possible to set, as a predictive value, a sum value of (i) the coding amount of all quantized coefficients in a macroblock to be coded supposing that the quantized coefficients were binarized and then applied with CABAC, (ii) the coding amount of all motion vectors in the macroblock supposing that the motion vectors were binarized and then applied with CABAC, and (iii) the coding amount of all coding information, except the motion vectors, in the macroblock supposing that the coding information were binarized and then applied with CABAC.

In the image coding device 1 shown in FIG. 12, when the predictive value is determined by the coding amount prediction unit 20, it is also possible to modify the predictive value according to the coding conditions for a target macroblock. This means that the coding amount prediction unit 20 can output a more accurate predictive value of a coding amount of each macroblock. Furthermore, by comparing a threshold value with the predictive value, the I_PCM decision can be made on a macroblock-by-macroblock basis.

Ninth Example

Figure 13:
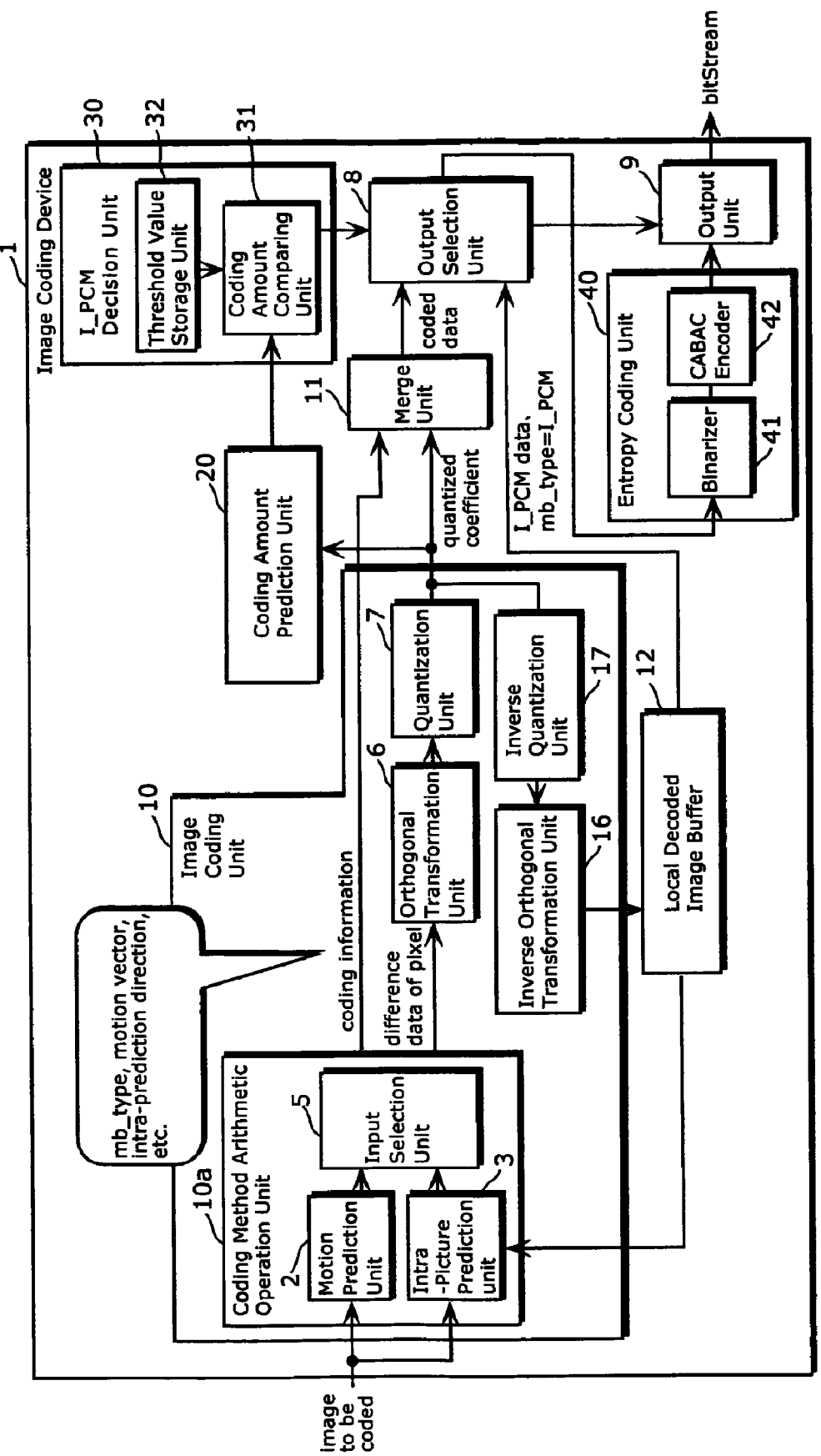
FIG. 13 is a block diagram showing the ninth example of the functional structure of the image coding device according to the embodiment of the present invention.

FIG. 13 is a block diagram showing the ninth example of the functional structure of the image coding device 1.

The structure of the image coding device 1 of FIG. 13 differs from the structures of the above-described image coding devices 1 in that the I_PCM data buffer 4 is replaced by a local decoded image buffer 12. Note that the image coding unit 10 further has an inverse quantization unit 17 and an inverse orthogonal transformation unit 16. Although the inverse quantization unit 17 and the inverse orthogonal transformation unit 16 are not shown in FIGS. 2-5, and 7-12, but as described previously, the image coding device 1 essentially has these units in the basic structure.

In the image coding device 1 shown in FIG. 13, the quantized coefficient data outputted from the quantization unit 7 is provided also to the inverse quantization unit 17 to be inverse quantized. Then, the inverse quantized data is passed to the inverse orthogonal transformation unit 16 to be applied with inverse orthogonal transformation in order to become local decoded image. This local decoded image is stored into the local decoded image buffer 12. The stored local decoded image is obtained by the intra-picture prediction unit 3, and used as reference image in intra-picture prediction of next macroblock.

Note that, in the image coding device 1 shown in FIG. 13, functions of the coding amount prediction unit 20 and the I_PCM decision unit 30 are the same as described for the functions of the coding amount prediction unit 20 and the I_PCM decision unit 30 in each of the image coding devices shown in FIGS. 2 to 5, and 7 to 12. That is, a predictive value of data per macroblock supposing that the data were binarized, or a predictive value of a coding amount per macroblock supposing that the coding amount were applied with CABAC, is outputted from the coding amount prediction unit 20, and compared to the threshold value stored in the threshold value storage unit 32, thereby performing the I_PCM decision on a macroblock-by-macroblock basis.

However, the image coding device 1 of FIG. 13 differs from each of the above-described image coding devices 1 in that if the predictive value is greater than the threshold value, the coding amount comparing unit 31 instructs the output selection unit 8 to select, as the I_PCM data, the local decoded image stored in the local decoded image buffer 12, not the original data of an input moving picture data.

In general, when the original data is to be used as the I_PCM data, a reference picture to be used in intra-picture prediction for a next macroblock is not the local decoded image, but the original data. Therefore, in a case where the intra-picture prediction for the next macroblock has already started prior to I_PCM decision of the current macroblock, the intra-picture prediction needs to be stopped and start all over again from the beginning.

On the other hands, in the image coding device 1 having the structure shown in FIG. 13, the local decoded image is used as I_PCM data. Therefore, pixels used as reference image in intra-picture prediction for the next macroblock are not changed, so that the intra-picture prediction for the next macroblock does not need to be started from the beginning again. As a result, a processing speed is increased.

As described above, in the image coding device 1 according to the embodiment of the present invention, the I_PCM decision can be made on a macroblock-by-macroblock basis prior to binarizing of to-be-coded data. Furthermore, the decision can be made more accurately by using various kinds of information or coding conditions for each macroblock.

Thus, the I_PCM decision can be performed at timing earlier compared to the conventional image coding device, thereby increasing the processing speed. Further, it is also possible to eliminate unnecessary processing such as binarizing of data which is not to be outputted as a bitstream, thereby increasing efficiency of the processing.

Furthermore, in the image coding device 1 according to the embodiment of the present information, due to the result of the above-described decision, for a prior macroblock, whose timing is earlier compared to the conventional image coding device, it is possible to more efficiently perform processing regarding motion prediction for a to-be-coded macroblock. As a result, an overall processing speed of the image coding device 1 can be increased.

The efficiency of the motion prediction of a to-be-coded macroblock is described in the following tenth and eleventh examples.

Tenth Example

Figure 14A:
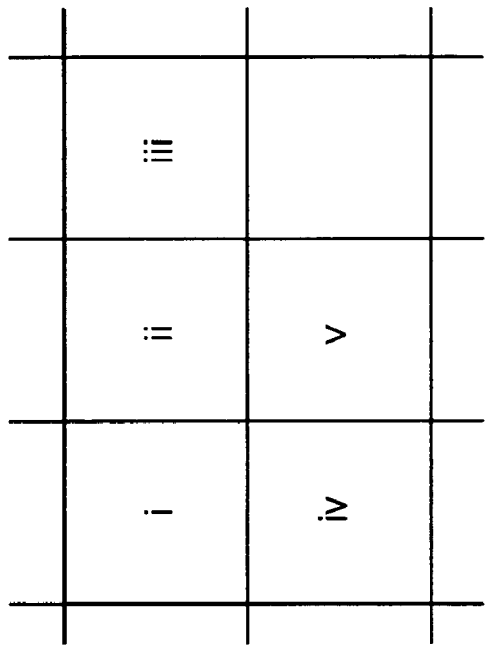
FIGS. 14A, 14B, and 14C are diagrams for explaining one example of efficiency of motion prediction processing for a macroblock to be coded.
Figure 14B:
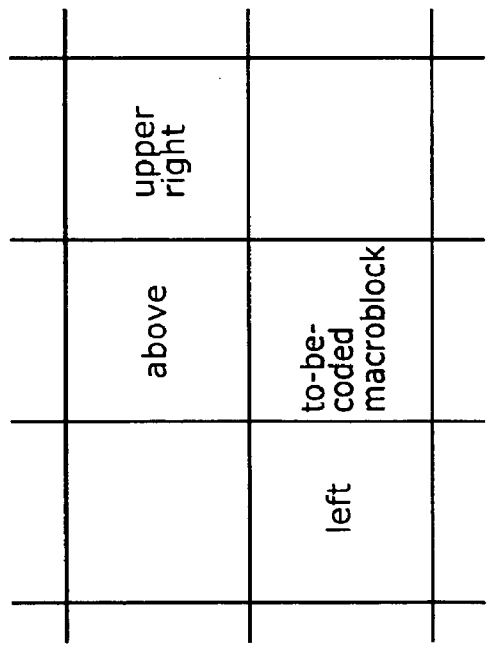
Figure 14C:
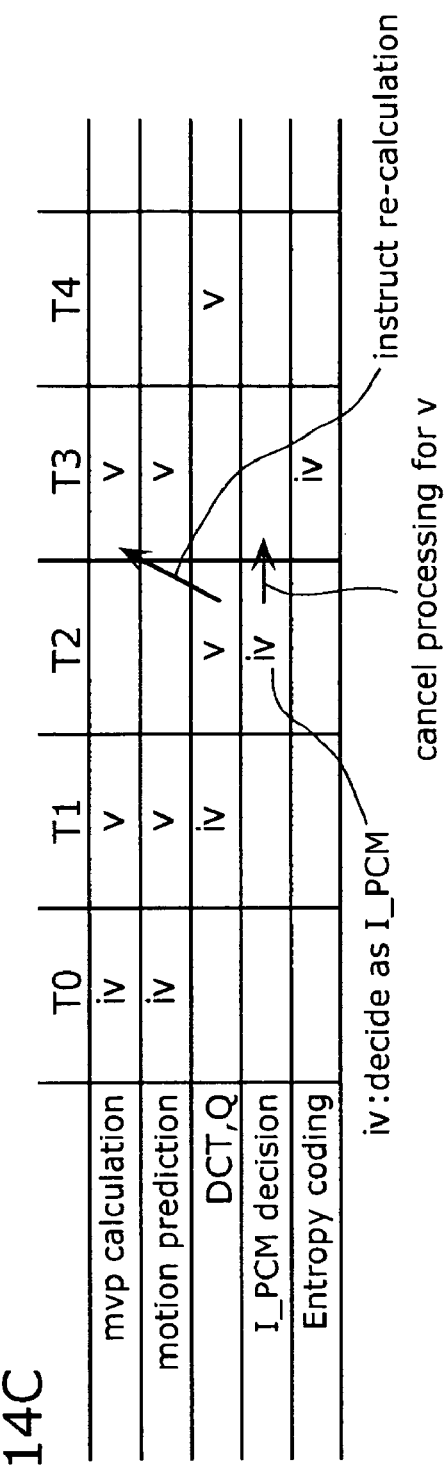

FIGS. 14A, 14B, and 14C show diagrams for explaining one example of the efficient processing regarding motion prediction for a macroblock to be coded (hereinafter, referred to also as a to-be-coded macroblock).

FIG. 14A is a diagram for explaining one example of reference macroblocks used in calculation of a predictive motion vector of the to-be-coded macroblock. In FIG. 14A, each segment represents each macroblock.

For the to-be-coded macroblock shown in FIG. 14(A), a motion vector of a macroblock positioned immediately left to the to-be-coded macroblock (hereinafter, referred to as a "left macroblock") is mvLXA, a motion vector of a macroblock positioned immediately above the to-be-coded macroblock (hereinafter, referred to as a "above macroblock") is mvLXB, and a motion vector of a macroblock positioned immediately upper-right to the to-be-coded macroblock (hereinafter, referred to as a "upper-right macroblock") is mvLXC.

mvpLX, which is a predictive motion vector of the to-be-coded macroblock, is calculated as a median value of the three motion vectors mvLXA, mvLXB, and mvLXC.

FIG. 14B is a diagram in which the macroblocks in FIG. 14A are assigned with respective numerals. Hereinafter, [iv] represents a macroblock assigned with a Roman numeral "iv" in FIG. 14B, and [v] represents a macroblock assigned with a Roman numeral "v" in FIG. 14B, for example. It is assumed that the below-described processing is performed by the image coding device 1 shown in FIG. 2, for example. Note that in any of the image coding devices 1 shown in other figures, the I_PCM decision unit 30 has a path via which the I_PCM decision unit 30 instructs the motion prediction unit 2 to realize the below-described processing.

Firstly, it is assumed that [iv] has been coded using motion prediction.

By the motion prediction, mvLX of [iv] is obtained. The mvLX of [iv] becomes mvLXA for [v], so that mvpLX calculation and motion prediction for [v] are started using mvLX of [iv] (left macroblock) as mvLXA.

Next, if the I_PCM decision unit 30 decides for [iv] that I_PCM is to be outputted as a bitstream, then mvLX of [iv] is to be changed. This is because mvLXA for [v] is changed, so that the mvpLX calculation for [v] needs to be performed all over again.

FIG. 14C is a time chart of the processing regarding the motion prediction. In FIG. 14C, each of T0, T1, . . . represents each predetermined continuous time period. Each processing performed during each time period is described briefly below. Note that the predictive motion vector mvpLX is hereinafter referred to simply as "mvp". Note also that, in the following processing, the processing regarding motion prediction is performed by the motion prediction unit 2, calculation of a DCT coefficient is performed by the orthogonal transformation unit 6, calculation of a quantized coefficient is performed by the quantization unit 7, and I_PCM decision is performed by the I_PCM decision unit 30.

During T0, processing for [iv] starts to perform mvp calculation and motion prediction.

During T1, a DCT coefficient and a quantized coefficient are calculated for [iv]. At the same time, for [v], mvp calculation and motion prediction are performed.

During T2, for [iv], I_PCM decision is performed. At the same time, for [v], a DCT coefficient and a quantized coefficient are calculated.

Here, as a result of the I_PCM decision for [iv], if it is decided for [iv] that I_PCM data is to be outputted as a bitstream, then the I_PCM decision unit 30 instructs the motion prediction unit 2 to cancel the above processing for [iv] and start processing for [iv] again from mvp calculation.

During T3, for [v], mvp calculation and motion prediction are performed again from the beginning. At the same time, entropy coding for [iv] is performed.

Here, in a case of the conventional image coding device, in the above timing chart, the I_PCM decision for [iv] is performed after the entropy coding for [iv]. Therefore, the second motion prediction for [v] based on a result of the I_PCM decision for [iv] is performed during T4 at the earliest.

However, in the image coding device 1 of the embodiment of the present invention, the I_PCM decision is performed prior to the entropy coding for [iv], more specifically, prior to binarization for [iv]. Therefore, the second motion prediction for [v] based on a result of the I_PCM decision can start from T3. Furthermore, in the mvp calculation, the motion vector of [iv], which is possibly to be changed, is not used, but motion vectors of [ii] (above macroblock) and [iii] (upper-right macroblock) are used.

The above is described in detail below. Here, the current macroblock is adjacent to the next macroblock. If a predictive value of the current macroblock is greater than the threshold value, the motion prediction unit 2 modifies information of another macroblock adjacent to the next macroblock, and uses the modified information in mvp calculation for the next macroblock. In this situation, the current macroblock corresponds to [iv] and the next macroblock corresponds to [v], for example.

Thus, the I_PCM decision is made at timing earlier compared to the conventional image coding device, so that if I_PCM data is decided for a certain macroblock to be outputted as a bitstream, motion prediction for a macroblock to be coded next can be started from the beginning attain, at timing earlier compared to the conventional image coding device.

This means that the motion prediction can be performed efficiently.

As a result, an overall processing speed of the image coding device 1 can be increased.

Eleventh Example

In the above tenth example, the processing has been described that, since I_PCM decision for a certain macroblock is performed at timing earlier compared to the conventional image coding device, eventually the second motion prediction for a next macroblock can be started at timing earlier compared to the conventional image coding device.

Here, the processing regarding motion prediction as shown in the time chart of FIG. 14C includes: mvp calculation for calculating a predictive motion vector (mvp); motion prediction for obtaining an actual motion vector (mv) from mvp and reference image; and mvd calculation for calculating a difference (mvd) between mvp and mv.

More specifically, the mvd calculation is performed according to the following equations which are defined by the AVC/H.264 standard.

$$mvLX[0]=mvpLX[0]+mvd\_IX[mbPartIdx][subMbPartIdx][0] \quad \text{(equation 1)}$$

$$mvLX[1]=mvpLX[1]+mvd\_IX[mbPartIdx][subMbPartIdx][1] \quad \text{(equation 2)}$$

mvd_IX, which represents the difference, is calculated according to the following equations which are transformed from the above equations.

$$mvd\_IX[mbPartIdx][subMbPartIdx][0]=mvLX[0]-mvpLX[0] \quad \text{(equation 3)}$$

$$mvd\_IX[mbPartIdx][subMbPartIdx][1]=mvLX[0]-mvpLX[1] \quad \text{(equation 4)}$$

Note that, in the equations 1 to 4, "0" in a parenthesis means an X-axis component of a vector, and "1" means a Y-axis component of the vector. Note also that each of "mbPartIdx" and "subMbPartIdx" is data for identifying a position of a macroblock.

That is, according to the equations 1 to 4, the predictive motion vector (mvp) and the difference (mvd) between mvp and the actual motion vector (mv) form the following equation.

$$mvd=mv-mvp \quad \text{(equation 5)}$$

mvd is used as data regarding a motion vector. The smaller mvd is, the smaller coding amount of actually coded mvd becomes. In other words, as shown in equation 5, the closer mv and mvp are, the smaller the coding amount of coded mvd becomes. Therefore, in the motion prediction for a to-be-coded macroblock, a pixel block whose mvp-mv difference is smaller is firstly searched in the reference image.

That is, as described above, if the mvp calculation for a to-be-coded macroblock is started all over again due to a result of the I_PCM decision for a prior macroblock, mv of the to-be-coded macroblock is generally changed due to the re-calculated mvp.

However, in the image coding device 1 according to the embodiment of the present invention, when mvd is calculated again, mv does not need to be changed, but the already obtained mv is used together with the changed mvp for the mvd re-calculation. Thereby, processing regarding motion prediction can be completed early.

FIG. 15 is a time chart of processing including the mvd calculation. In FIG. 15, each of T0, T1, ... represents each predetermined continuous time period. Here, the numerals "iv" and "v" in FIG. 15 represent identical macroblocks assigned with the same numerals in FIG. 14B. Each processing performed during each time period is described briefly below. Note also that, in the following processing, the processing regarding motion prediction is performed by the motion prediction unit 2, calculation of a DCT coefficient is performed by the orthogonal transformation unit 6, calculation of a quantized coefficient is performed by the quantization unit 7, and I_PCM decision is performed by the I_PCM decision unit 30.

During T0, processing for [iv] starts to perform mvp calculation and motion prediction.

During T1, a DCT coefficient, a quantized coefficient, and mvd are calculated for [iv]. At the same time, for [v], mvp calculation and motion prediction are performed.

During T2, for [iv], I_PCM decision is performed. At the same time, for [v], a DCT coefficient, a quantized coefficient, and mvd are calculated. Here, as a result of the I_PCM decision for [iv], if it is decided for [iv] that I_PCM data is to be outputted as a bitstream, then the I_PCM decision unit 30 instructs the motion prediction unit 2 to re-caclulate mvd of [v] during T3.

During T3, for [v], I_PCM decision and the mvd re-calculation are performed. The mvd re-calculation includes calculating of mvp which is a predictive motion vector, and then calculating of a difference between the calculated mvp and mv. The mv is assumed to be obtained during T2. At the same time, for [iv], entropy coding is performed.

During T4, for [v], processing for entropy coding is performed.

Thus, the I_PCM decision is performed at timing earlier compared to the conventional image coding device. Therefore, when I_PCM data is decided for a certain macroblock to be outputted as a bitstream, a timing of the second motion prediction for a next macroblock can be earlier compared to the conventional image coding device.

The above is described in detail below. Here, a current macroblock is adjacent to a macroblock to be coded next (hereinafter, referred to as a "next macroblock"), and mvp, mv, mvd of the next macroblock have been calculated. If a predictive value of the current macroblock is greater than the threshold value, then information of another macroblock adjacent to the next macroblock is modified, and mvp of the next macroblock is re-calculated using the modified information. Then, mvd of the next macroblock is re-calculated using the re-calculated mvp and the already obtained mv.

In other words, in order to calculate mvd in the processing regarding motion prediction, mv does not need to be newly obtained, but the already obtained mv is used together with the changed mvp. Thereby, the second motion prediction can be completed early. As a result, an overall processing speed of the image coding device 1 can be increased.

Note that it has been described that the first mvd calculation for the next macroblock is performed before the I_PCM decision for the current macroblock, which is immediately prior to the next macroblock, but the first mvd calculation for the next macroblock may be performed after the I_PCM decision for the current macroblock. For example, in the time chart of FIG. 15, mvd calculation for [v] may be performed after I_PCM decision for [iv] during T2.

In this case, in the time chart of FIG. 15, since I_PCM data is decided to be outputted as a bitstream for [iv], the mvd calculation for [v], which has been firstly performed during T2, is performed again during T3. However, as described above, if the first mvd calculation for [v] is performed after the I_PCM decision for [iv], it is possible to calculate mvd for [v] using the currently obtained mvp, regardless of whether or not the mvp has been changed according to the I_PCM decision.

In other words, the motion prediction unit 2 calculates mvp and mv of the next macroblock, when the current macroblock is adjacent to the next macroblock. Then, a predictive value of the current macroblock is compared to the threshold value prior to mvd calculation for the next macroblock. As a result, if the predictive value is greater than the threshold value, the motion prediction unit 2 modifies information of another macroblock adjacent to the next macroblock, then re-calculate mvp of the next macroblock using the modified information, and calculate mvd of the next macroblock using the re-calculated mvp and the already obtained mv.

Thereby, the mvd calculation for [v] is required only once, regardless of a result of the I_PCM decision for [iv].

As described above, in the image coding device 1 according to the embodiment of the present invention, the I_PCM decision is performed earlier in the processing regarding motion prediction, more specifically, in the mvp re-calculation described in the tenth example. Thereby, processing from mvp re-calculation to mv re-searching can be executed speedily.

Note that, as described in the eleventh example, in the motion prediction including mvd re-calculation, even if mvp is changed and to be used in the mvd re-calculation, the mv does not need to be changed and the existing mv can be directly used in the mvd re-calculation. Thereby the motion prediction can be completed early.

Note also that a trigger of the mvp re-calculation and the mvd re-calculation is an output as a result of the I_PCM decision. Therefore, the mvp re-calculation and the mvd re-calculation can be started at timing earlier than compared to the conventional image coding device.

Thus, the image coding device 1 according to the embodiment of the present invention is an image coding device in which binarized data is applied with entropy coding, and by which image data can be processed at a high speed.

Although only the exemplary embodiments of the present invention has been described in detail above, those skilled in the art will be readily appreciate that many modifications are possible in the exemplary embodiments without materially departing from the novel teachings and advantages of the present invention. Accordingly, all such modifications are intended to be included within the scope of the present invention.

According to one example of an industrial application, the present invention can be used as an image coding device in which binarized data is applied with entropy coding. For example, the present invention is suitable for an image coding device by which data is coded using data compression techniques according to the AVC/H.264 standard, in order to output high-definition image.

What is claimed is:

1. An image coding device comprising:
an image coding unit operable to code image data;
an entropy coding unit operable to binarize the coded image data and apply entropy coding to the binarized data;
a prediction unit operable to obtain a predictive value corresponding to a predicted coding amount of the image data on a predetermined data unit basis supposing that the entropy coding were applied to the image data, said prediction unit obtaining the predicted value without actual binarizing being performed and based on information regarding the image data which is obtained from said image coding unit;
a decision unit operable to compare the predictive value to a predetermined threshold value and decide to output I_PCM data, which is image data that has not been applied with the entropy coding by said entropy coding unit, when the predictive value is greater than the threshold value; and
an output unit operable to output the I_PCM data when said decision unit decides to output the I_PCM data, and output data applied with the entropy coding when said decision unit does not decide to output the I_PCM data.

2. The image coding device according to claim 1, wherein the predetermined data unit is one macroblock.

3. The image coding device according to claim 1, wherein the predetermined data unit is one macroblock;
said image coding unit comprises an orthogonal transformation unit operable to apply orthogonal transformation to the image data to obtain a coefficient, and a quantization unit operable to quantize the coefficient; and
said prediction unit comprises a coefficient converting unit operable to convert the quantized coefficient to a number of bits of the quantized coefficient supposing that the quantized coefficient were binarized, and an adding unit operable to add, for each macroblock, the numbers of bits obtained by said coefficient converting unit all together in order to obtain the predictive value.

4. The image coding device according to claim 3, wherein said image coding unit further comprises an arithmetic operation unit operable to calculate a motion vector regarding the macroblock;
said prediction unit further comprises a motion converting unit operable to convert the motion vector to the number of bits of the motion vector supposing that the motion vector were binarized; and
said adding unit is operable to add, for each macroblock, the numbers of bits obtained by said coefficient converting unit, and the numbers of bits obtained by said motion converting unit in order to obtain the predictive value.

5. The image coding device according to claim 4, wherein said arithmetic operation unit is further operable to calculate coding information regarding the macroblock, the coding information not including the motion vector;
said prediction unit further comprises a coding information converting unit operable to convert the coding information to the number of bits of the coding information supposing that the coding information were binarized; and
said adding unit is operable to add, for each macroblock, the numbers of bits obtained by said coefficient converting unit, the numbers of bits obtained by said motion converting unit, and the numbers of bits obtained by said coding information converting unit in order to obtain the predictive value.

6. The image coding device according to claim 1, wherein the predetermined data unit is one macroblock;
said image coding unit comprises an orthogonal transformation unit operable to apply orthogonal transformation to the image data to obtain a coefficient, and a quantization unit operable to quantize the coefficient;
said prediction unit comprises a coefficient converting unit operable to convert the quantized coefficient to a coding amount of the quantized coefficient supposing that the entropy coding were applied to the quantized coefficient; and
an adding unit is operable to add, for each macroblock, the coding amounts obtained by said coefficient converting unit all together in order to obtain the predictive value.

7. The image coding device according to claim 6, wherein said image coding unit further comprises an arithmetic operation unit operable to calculate a motion vector regarding the macroblock;
said prediction unit further comprises a motion converting unit operable to convert the motion vector to a coding amount of the motion vector supposing that the entropy coding were applied to the motion vector; and
said adding unit is operable to add, for each macroblock, the coding amounts obtained by said coefficient converting unit, and the coding amounts obtained by said motion converting unit in order to obtain the predictive value.

8. The image coding device according to claim 7, wherein said arithmetic operation unit is further operable to calculate coding information regarding the macroblock, the coding information not including the motion vector;
said prediction unit further comprises a coding information converting unit operable to convert the coding information to a coding amount of the coding information supposing that the entropy coding were applied to the coding information; and
said adding unit is operable to add, for each macroblock, the coding amounts obtained by said coefficient converting unit, the coding amounts obtained by said motion converting unit, and the coding amounts obtained by said coding information converting unit in order to obtain the predictive value.

9. The image coding device according to claim 1, wherein the predetermined data unit is one macroblock; and
said prediction unit further comprises a modification unit operable to obtain a coding condition under which the entropy coding is applied to the macroblock, and modify the predictive value obtained by said prediction unit according to the coding condition.

10. The image coding device according to claim 9, wherein said image coding unit comprises an orthogonal transformation unit operable to apply orthogonal transformation to the image data to obtain a coefficient; and a quantization unit operable to quantize the coefficient; and
the coding condition is at least one of: 1) a type of a picture in which the macroblock is included; 2) a value of a quantization parameter used in the quantization by said quantization unit; 3) a value of an output rate of data outputted from said image coding device; and 4) a type of residual_block which is applied with the entropy coding.

11. The image coding device according to claim 1, wherein said image coding unit comprises an orthogonal transformation unit operable to apply orthogonal transformation to the image data to obtain a coefficient, a quantization unit operable to quantize the coefficient, an inverse quantization unit operable to inversely quantize the quantized coefficient, and an inverse orthogonal transformation unit operable to apply inverse orthogonal transformation to the value obtained from said inverse quantization unit in order to obtain a local decoded image; and
the I_PCM data is the local decoded image.

12. The image coding device according to claim 1, wherein the I_PCM data is image data inputted to said image coding device.

13. The image coding device according to claim 1, wherein the predetermined data unit is one macroblock;
said image coding unit comprises a motion prediction unit operable to calculate a predictive motion vector mvp for a macroblock to be coded using information of a macroblock adjacent to the macroblock to be coded; and
when a current macroblock is adjacent to a macroblock to be coded next, and said decision unit decides for the current macroblock that the predictive value is greater than the threshold value, said motion prediction unit is operable to modify information of a macroblock adjacent to the macroblock to be coded next to the current macroblock, and calculate a predictive motion vector mvp for the macroblock to be coded next using the modified information.

14. The image coding device according to claim 1, wherein the predetermined data unit is one macroblock;
said image coding unit:
(1) is operable to calculate a predictive motion vector mvp for a macroblock to be coded using information of a macroblock adjacent to the macroblock to be coded;
(2) is operable to calculate a motion vector my for the macroblock to be coded using the predictive motion vector mvp; and
(3) includes a motion prediction unit operable to calculate a difference mvd between the predictive motion vector mvp and the motion vector my;
when the current macroblock is adjacent to the macroblock to be coded next, said motion prediction unit is operable to calculate, for the macroblock to be coded next to the current macroblock, a predictive motion vector mvp, a motion vector my, and a difference mvd according to (1), (2), and (3); and
when said decision unit decides for the current macroblock that the predictive value is greater than the threshold value, said motion prediction unit is operable to modify information of a macroblock adjacent to the macroblock to be coded next, re-calculate the predictive motion vector mvp for the macroblock to be coded next in (1) using the modified information, and re-calculated the difference mvd of the macroblock to be coded next using the re-calculated predictive motion vector mvp and the motion vector my obtained in (2).

15. The image coding device according to claim 1, wherein the predetermined data unit is one macroblock;
said image coding unit:
(1) is operable to calculate a predictive motion vector mvp for a macroblock to be coded using information of a macroblock adjacent to the macroblock to be coded;
(2) is operable to calculate a motion vector my for the macroblock to be coded using the predictive motion vector mvp; and
(3) includes a motion prediction unit operable to calculate a difference mvd between the predictive motion vector mvp and the motion vector mv;
when a current macroblock is adjacent to a macroblock to be coded next, said motion prediction unit is operable to calculate, for the macroblock to be coded next to the current macroblock, a predictive motion vector mvp and a motion vector my according to (1) and (2);
said decision unit is operable to:
perform the deciding for the current macroblock, prior to when said motion prediction unit calculates a difference mvd of the macroblock to be coded next in (3); and
when said decision unit indicates for the current macroblock that the predictive value is greater than the threshold value, said motion prediction unit is further operable to modify information of a macroblock adjacent to the macroblock to be coded next, re-calculate the predictive motion vector mvp for the macroblock to be coded next in (1) using the modified information, and calculate a difference mvd of the macroblock to be coded next using the re-calculated predictive motion vector mvp and the motion vector my obtained in (2).

16. The image coding device according to claim 1, wherein the predetermined data unit is one macroblock; and
the threshold value is a maximum coding amount of one macroblock defined by an AVC/H.264 standard.

17. The image coding device according to claim 1, wherein the predetermined data unit is one macroblock; and
the threshold value is a value obtained by subtracting a predetermined margin from a maximum coding amount of one macroblock defined by an AVC/H.264 standard.

18. The image coding device according to claim 1, wherein the entropy coding is Context-based Adaptive Binary Arithmetic Coding (CABAC).

19. An image coding method comprising:
coding image data;
binarizing the coded image data and applying entropy coding to the binarized data;
obtaining a predictive value corresponding to a predicted coding amount of the image data on a predetermined data unit basis supposing that the entropy coding were applied to the image data, the predictive value being obtained without actual binarizing being performed and based on information regarding the image data which is obtained in said coding; and
comparing the predictive value to a predetermined threshold value;
deciding to output I_PCM data, which is image data that has not been applied with the entropy coding, when the predictive value is greater than the threshold value; and
outputting the I_PCM data when the I_PCM data is decided to be outputted, and outputting data applied with the entropy coding when the I_PCM data is not decided to be outputted.

20. A computer program stored on a non-transitory computer-readable recording medium for execution on a computer to perform image coding, said computer program comprising:
a program code operable to cause the computer to:
code image data;
binarize the coded image data and apply entropy coding to the binarized data;
obtain a predictive value corresponding to a predicted coding amount of the image data on a predetermined data unit basis supposing that the entropy coding were applied to the image data, the predicted value being obtained without actual binarizing being performed and based on information regarding the image data which is obtained in the coding; and
compare the predictive value to a predetermined threshold value;
decide to output I_PCM data, which is the image data that has not been applied with the entropy coding, when the predictive value is greater than the threshold value; and
outputting the I_PCM data when the I_PCM data is decided to be outputted, and outputting data applied with the entropy coding when the I_PCM data is not decided to be outputted.

21. An integrated circuit comprising:

an image coding unit operable to code image data;

an entropy coding unit operable to binarize the coded image data and apply entropy coding to the binarized data;

a prediction unit operable to obtain a predictive value corresponding to a predicted coding amount of the image data on a predetermined data unit basis supposing that the entropy coding were applied to the image data, the prediction unit obtaining the predictive value without actual binarizing being performed and based on information regarding the image data which is obtained from said image coding unit; and a decision unit operable to compare the predictive value to a predetermined threshold value and decide to output I_PCM data, which is the image data that has not been applied with the entropy coding by said entropy coding unit, when the predictive value is greater than the threshold value; and an output unit operable to output the I_PCM data when said decision unit decides to output the I_PCM data, and outputs data applied with the entropy coding when said decision unit does not decide to output the I_PCM data.

* * * * *